US009615095B2

(12) United States Patent
Fukata

(10) Patent No.: US 9,615,095 B2
(45) Date of Patent: Apr. 4, 2017

(54) CODING DEVICE, IMAGING DEVICE, CODING TRANSMISSION SYSTEM, AND CODING METHOD

(75) Inventor: Akitaka Fukata, Kanagawa (JP)

(73) Assignee: Sony Corporation, Tokyo (JP)

( * ) Notice: Subject to any disclaimer, the term of this patent is extended or adjusted under 35 U.S.C. 154(b) by 1056 days.

(21) Appl. No.: 13/067,204

(22) Filed: May 17, 2011

(65) Prior Publication Data

US 2011/0317756 A1 Dec. 29, 2011

(30) Foreign Application Priority Data

Jun. 28, 2010 (JP) ................................ 2010-146434

(51) Int. Cl.
| H04N 19/124 | (2014.01) |
| H04N 19/172 | (2014.01) |
| H04N 19/61 | (2014.01) |
| H04N 19/132 | (2014.01) |
| H04N 19/152 | (2014.01) |
| H04N 19/177 | (2014.01) |

(52) U.S. Cl.
CPC ......... *H04N 19/124* (2014.11); *H04N 19/132* (2014.11); *H04N 19/152* (2014.11); *H04N 19/172* (2014.11); *H04N 19/177* (2014.11); *H04N 19/61* (2014.11)

(58) Field of Classification Search
CPC ........... H04N 7/26079; H04N 7/26111; H04N 7/26186; H04N 7/2626; H04N 7/26271; H04N 7/50; H04N 19/124; H04N 19/132; H04N 19/152; H04N 19/172; H04N 19/177; H04N 19/61
See application file for complete search history.

(56) References Cited

U.S. PATENT DOCUMENTS

| 6,061,399 A * | 5/2000 | Lyons et al. ................... 375/240 |
| 6,507,615 B1 * | 1/2003 | Tsujii et al. .............. 375/240.04 |
| 2003/0007558 A1 * | 1/2003 | Vetro et al. ............. 375/240.03 |
| 2003/0043904 A1 * | 3/2003 | Naito ....................... 375/240.03 |

(Continued)

FOREIGN PATENT DOCUMENTS

| JP | 2000-050254 | 2/2000 |
| JP | 2000-209584 A | 7/2000 |

(Continued)

OTHER PUBLICATIONS

Japanese Office Action issued Jan. 14, 2014 for corresponding Japanese Application No. 2010-146434.

*Primary Examiner* — Peter D Le
(74) *Attorney, Agent, or Firm* — Chip Law Group

(57) ABSTRACT

A coding device includes: an obtaining section configured to obtain moving image data including a plurality of pieces of image data reproducible at a predetermined rate; a determining section configured to determine whether coding of each piece of the image data of the moving image data obtained by the obtaining section is necessary, and output an indicating signal indicating image data set as a coding object or image data not set as a coding object; and a coding performing section configured to be supplied with the indicating signal, and code the plurality of pieces of image data obtained by the obtaining section while discretely reducing the image data according to determination of the determining section.

17 Claims, 24 Drawing Sheets

(56) References Cited

U.S. PATENT DOCUMENTS

| | | | |
|---|---|---|---|
| 2003/0202706 A1* | 10/2003 | Uchibayashi | G06T 9/00 382/236 |
| 2004/0174278 A1* | 9/2004 | Kadono et al. | 341/67 |
| 2005/0013365 A1* | 1/2005 | Mukerjee et al. | 375/240.16 |
| 2005/0089091 A1* | 4/2005 | Kim et al. | 375/240.01 |
| 2007/0248170 A1* | 10/2007 | Baba | H04N 21/2343 375/240.25 |
| 2008/0232468 A1* | 9/2008 | Kwon et al. | 375/240.12 |
| 2010/0277613 A1* | 11/2010 | Seki et al. | 348/231.2 |

FOREIGN PATENT DOCUMENTS

| | | |
|---|---|---|
| JP | 2003-092759 A | 3/2003 |
| JP | 2005-323167 A | 11/2005 |
| JP | 2008-236789 | 10/2008 |

\* cited by examiner

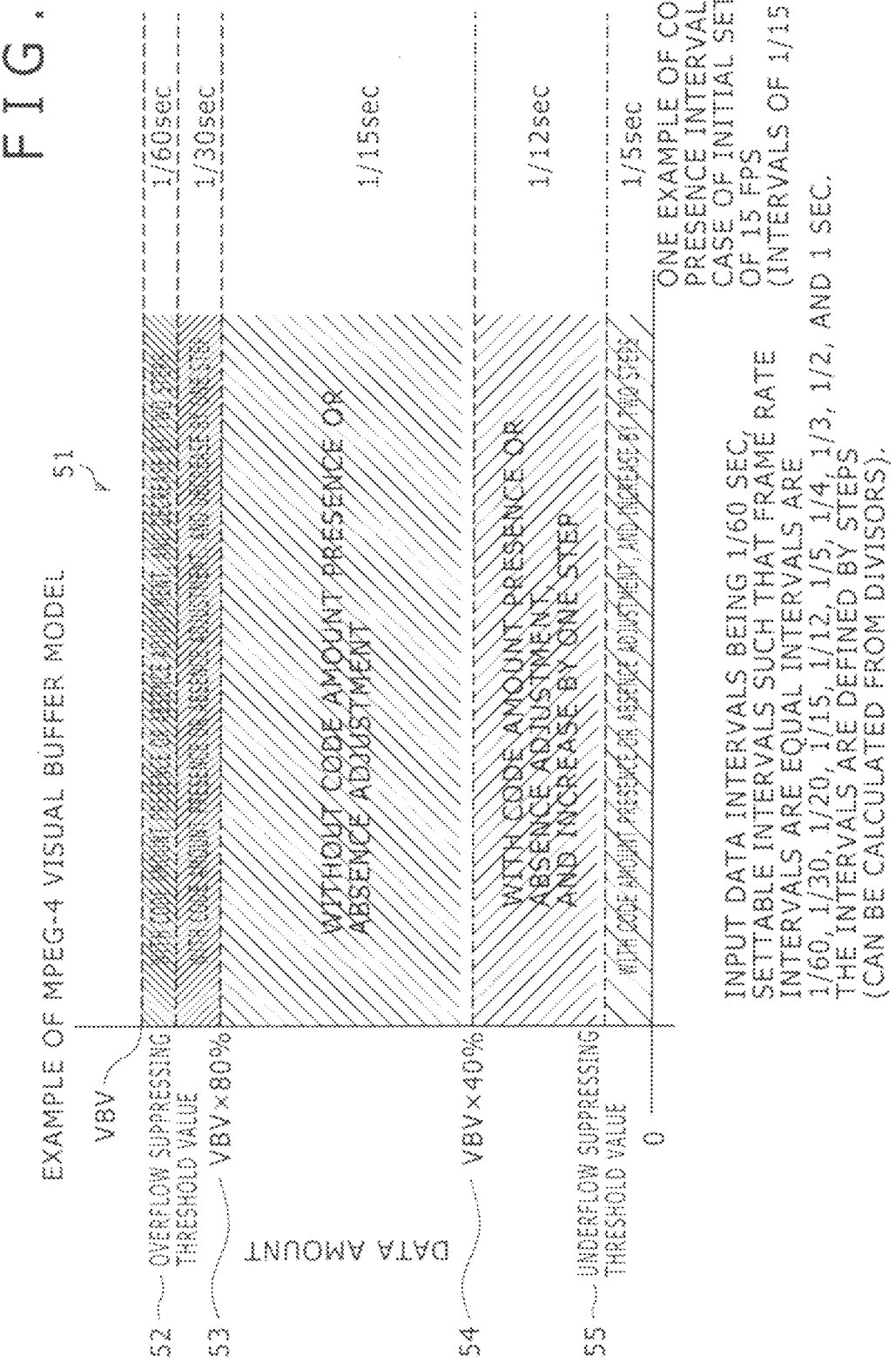

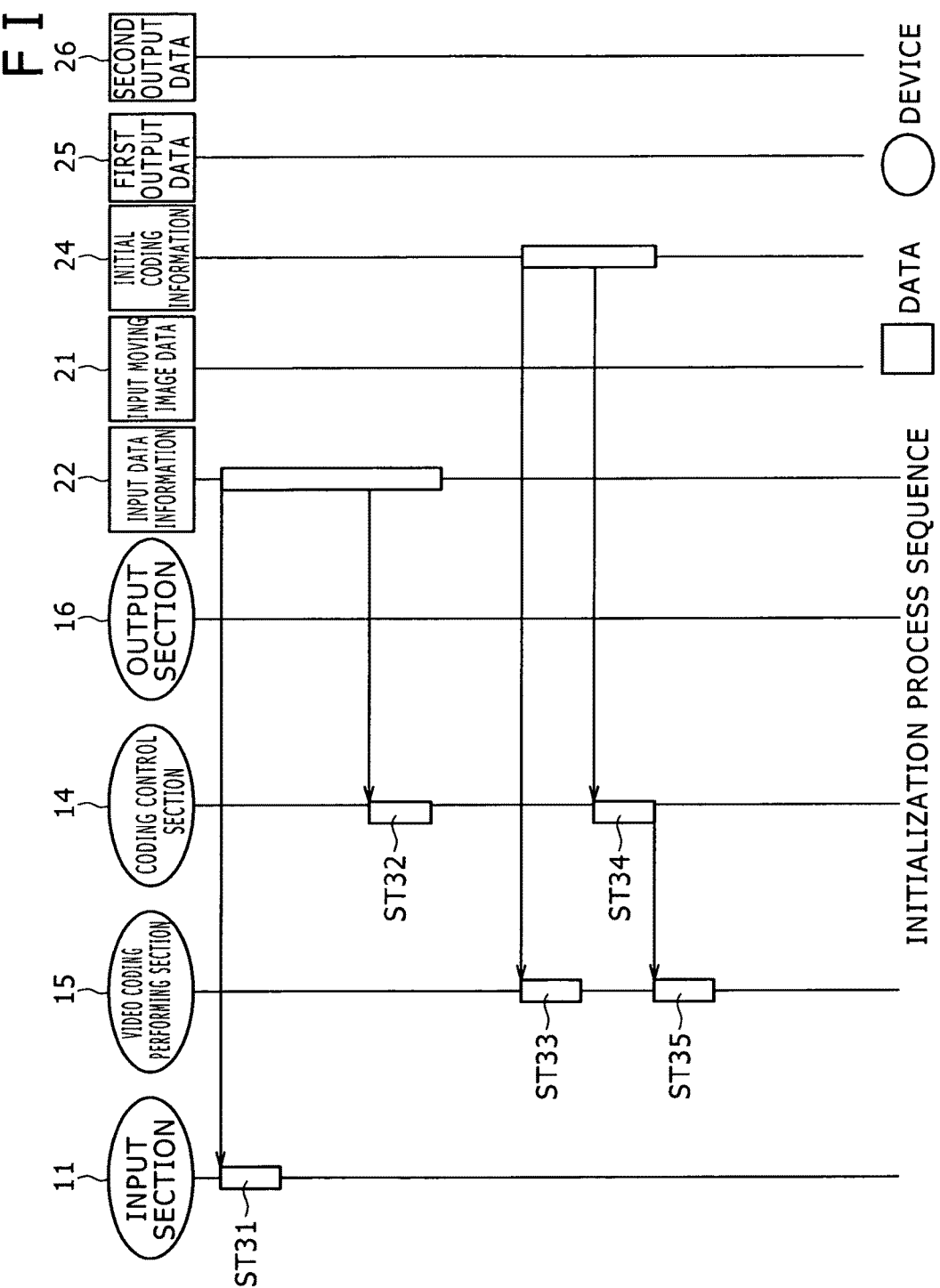

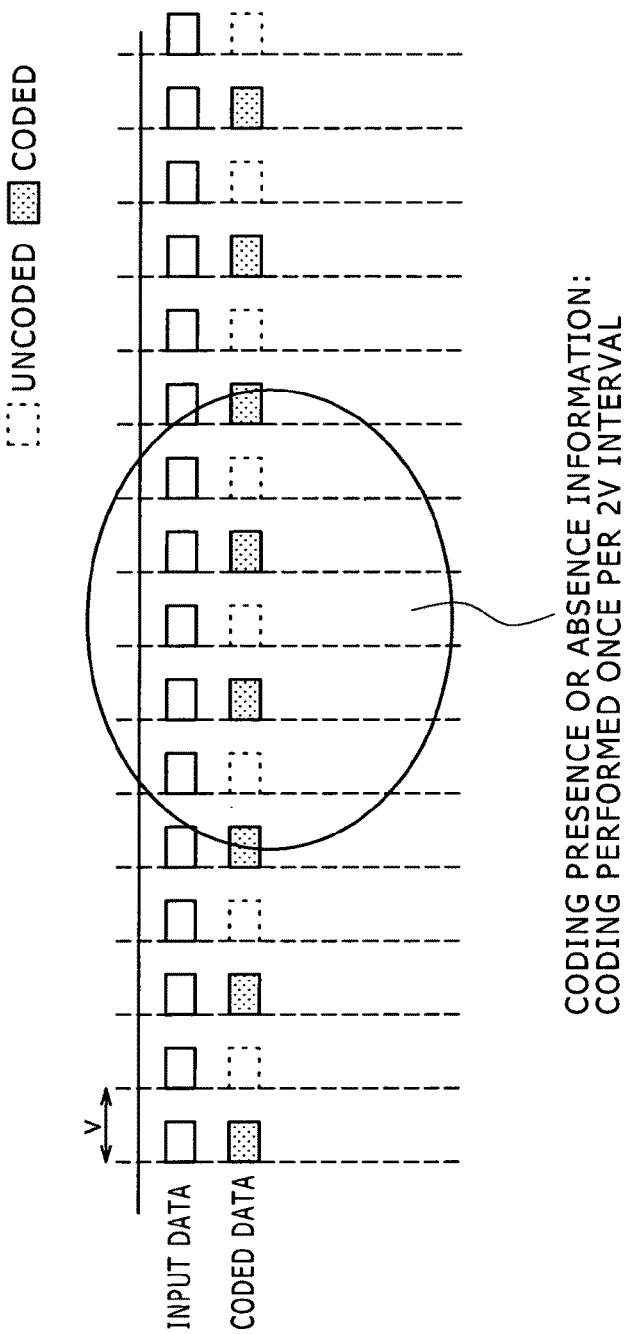

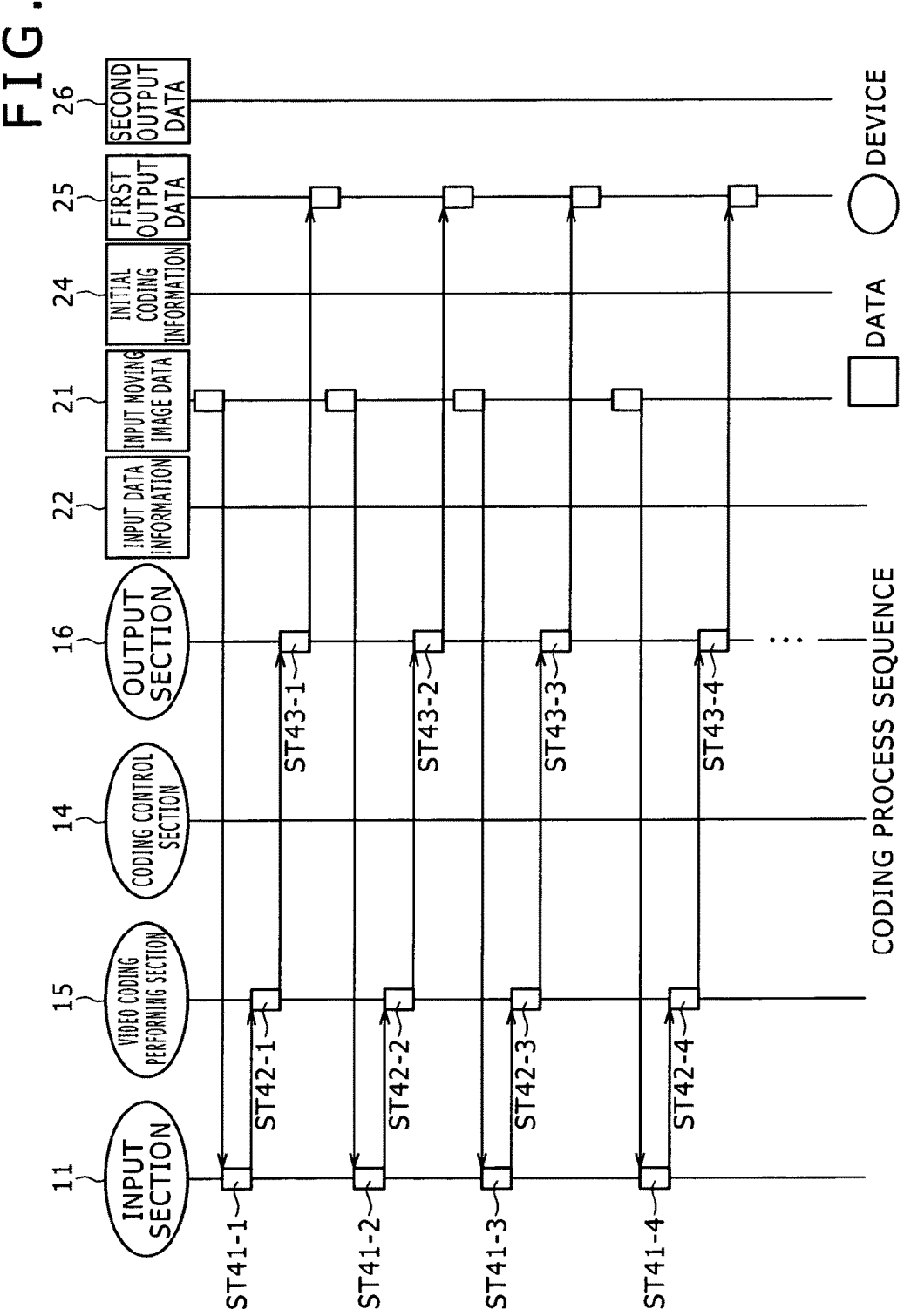

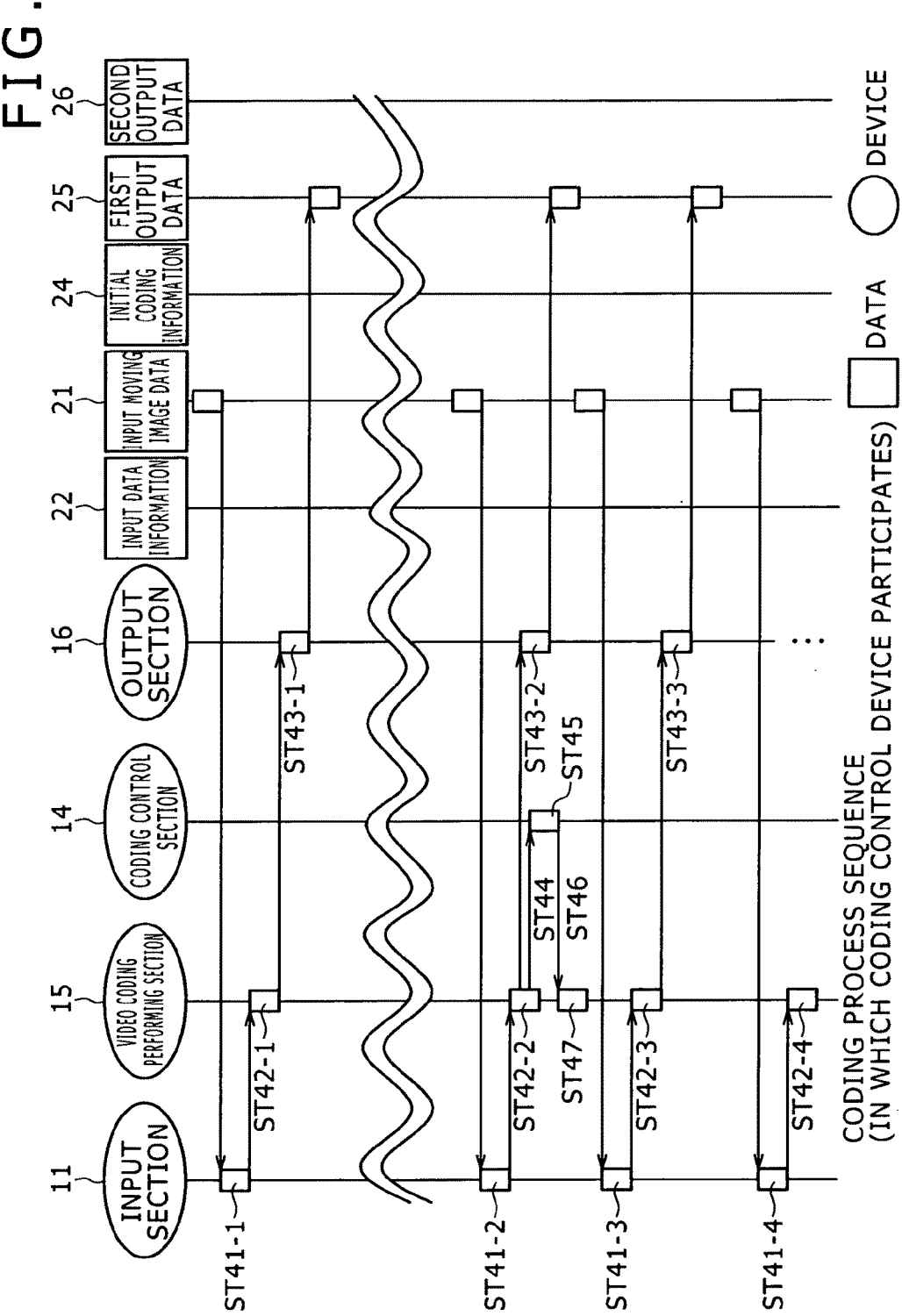

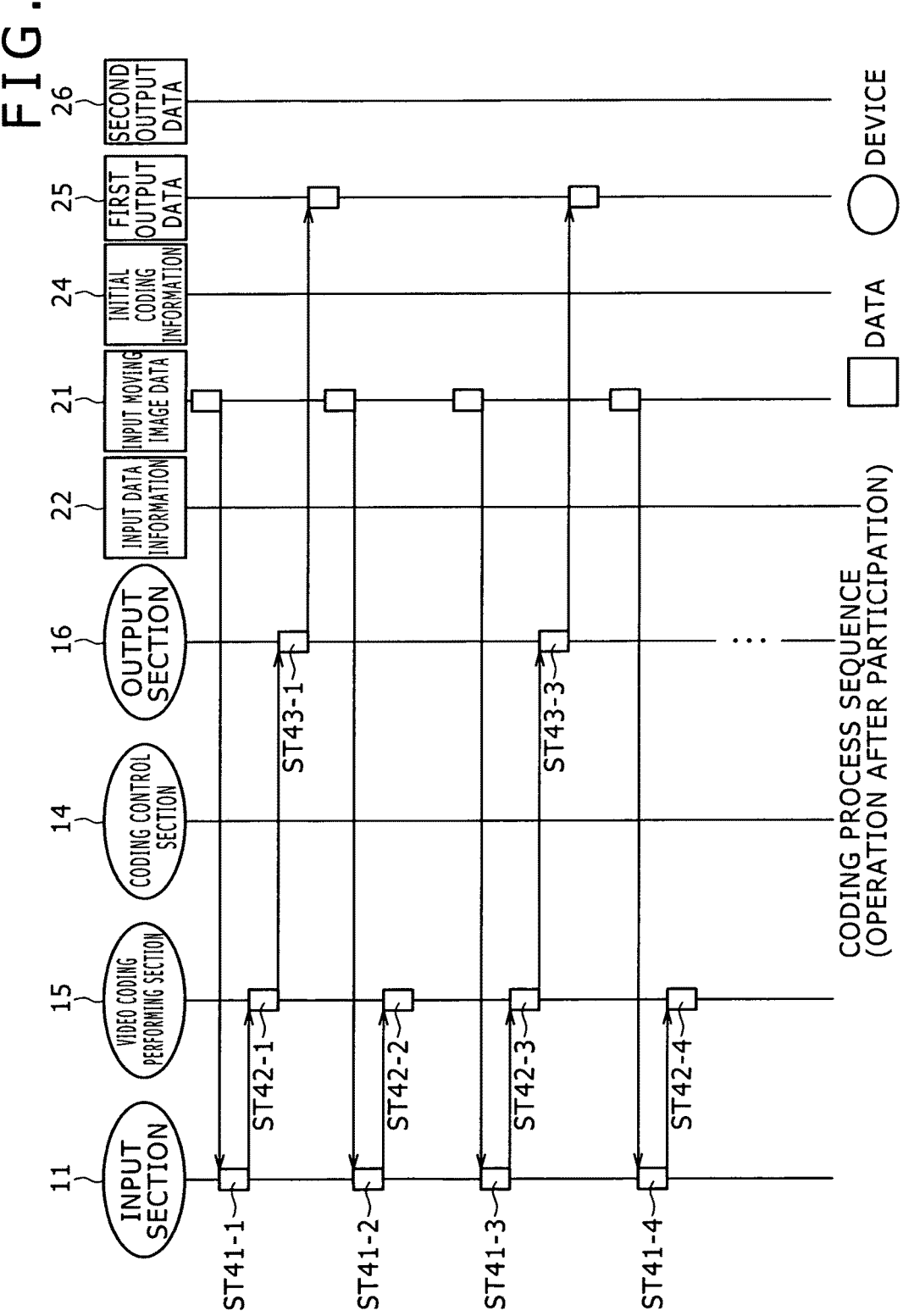

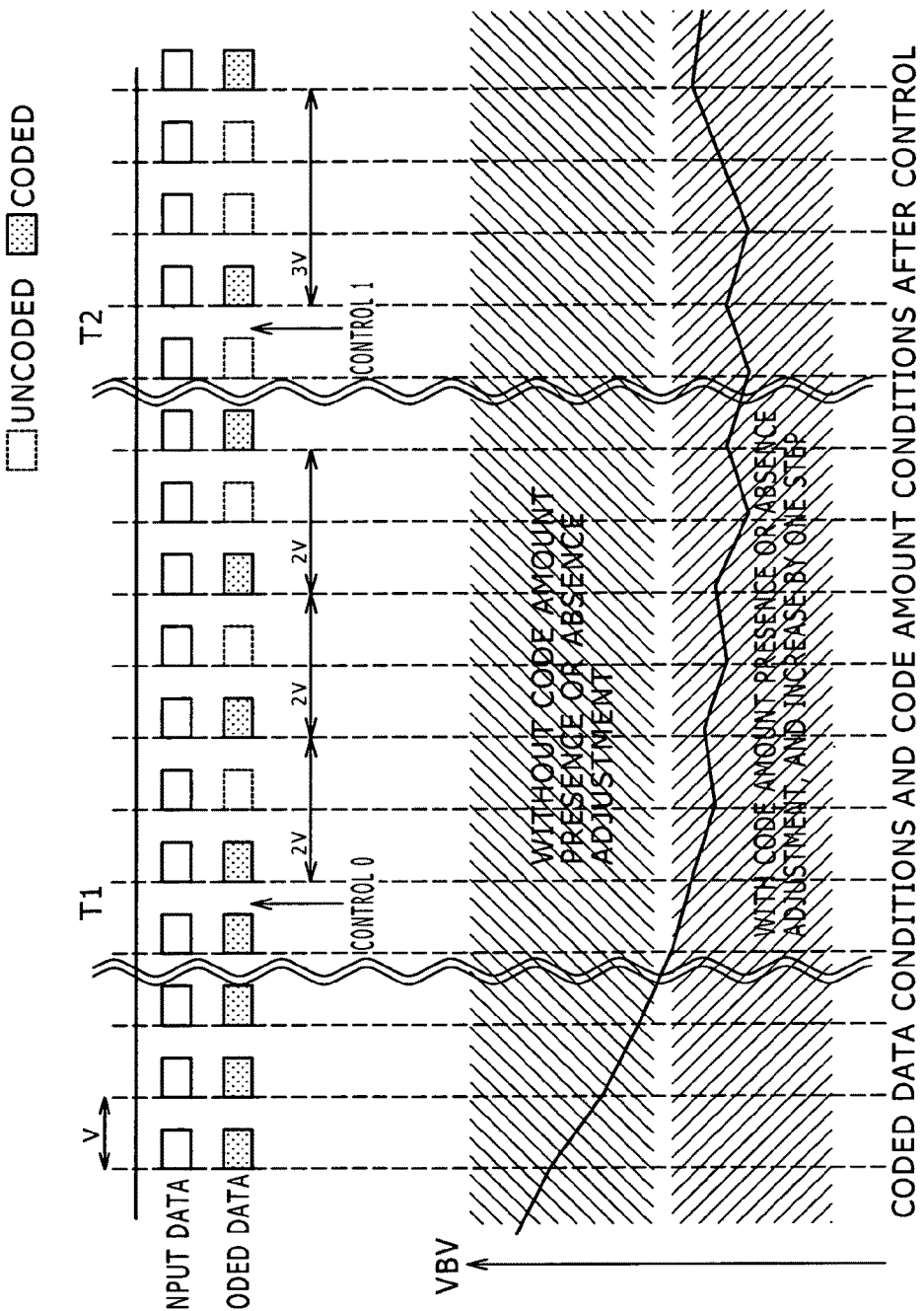

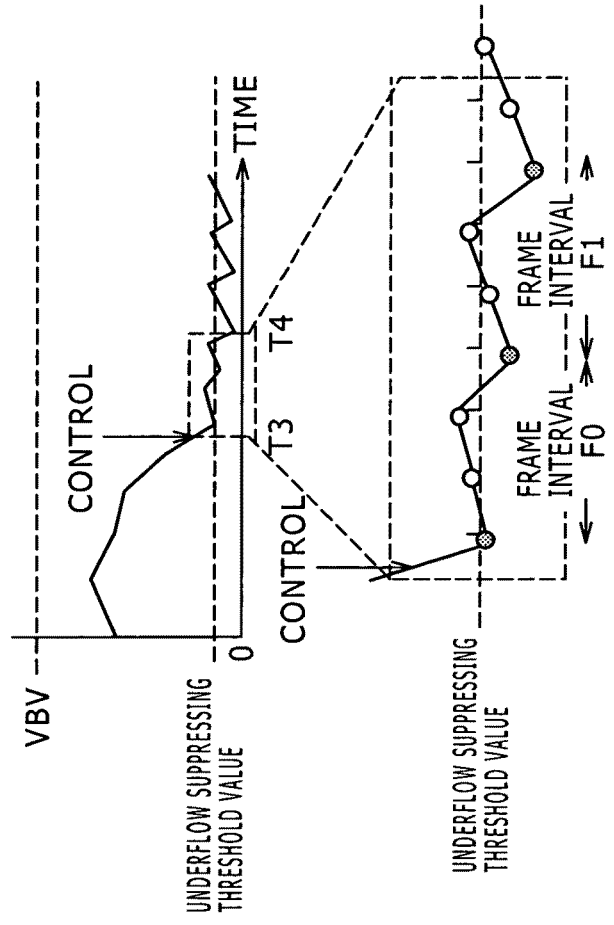
FIG. 15A
FIG. 15B

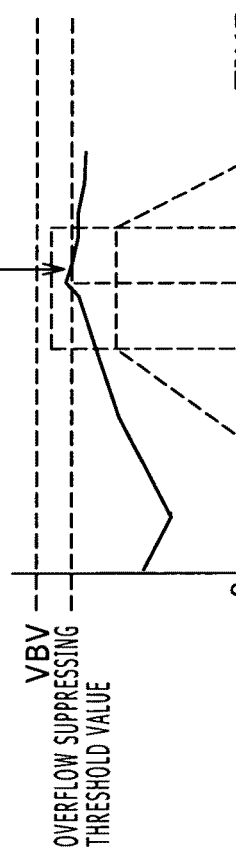
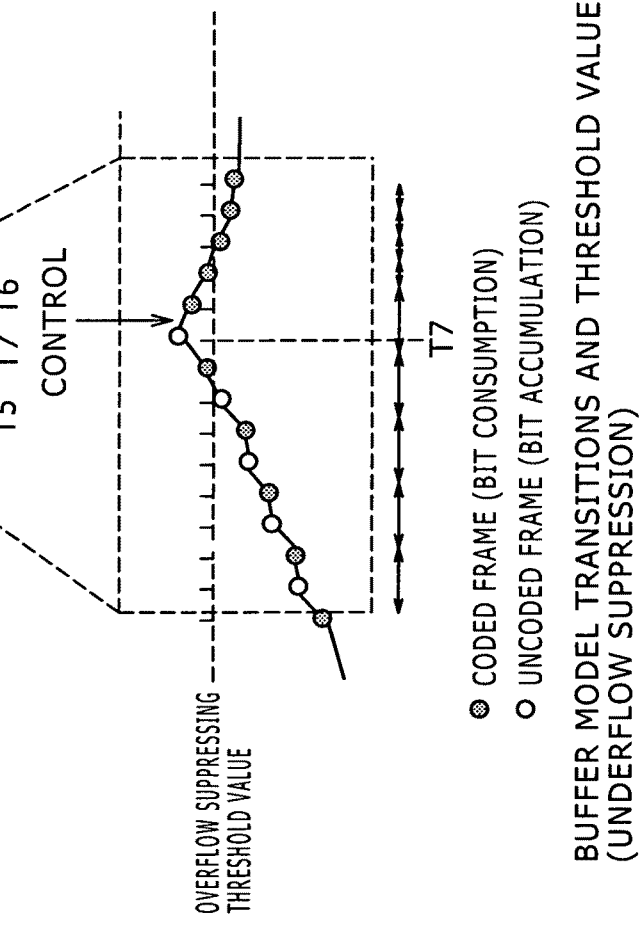
FIG.16A
FIG.16B

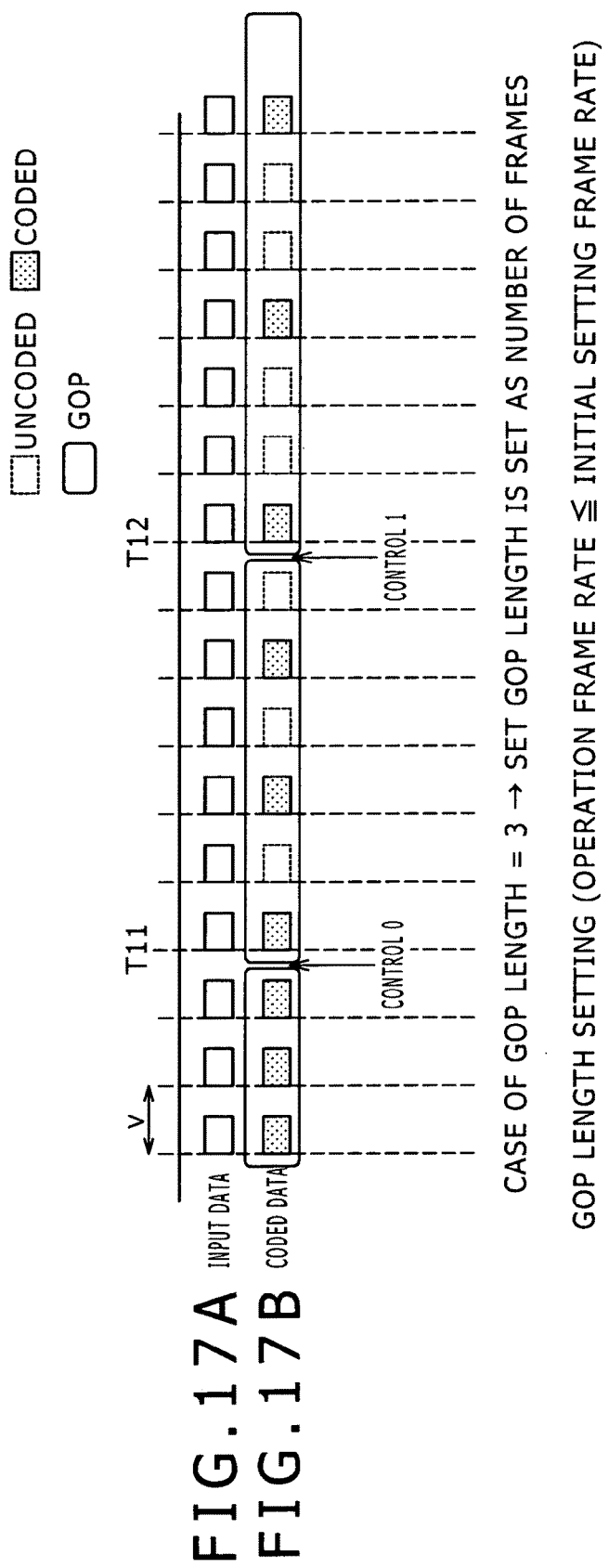

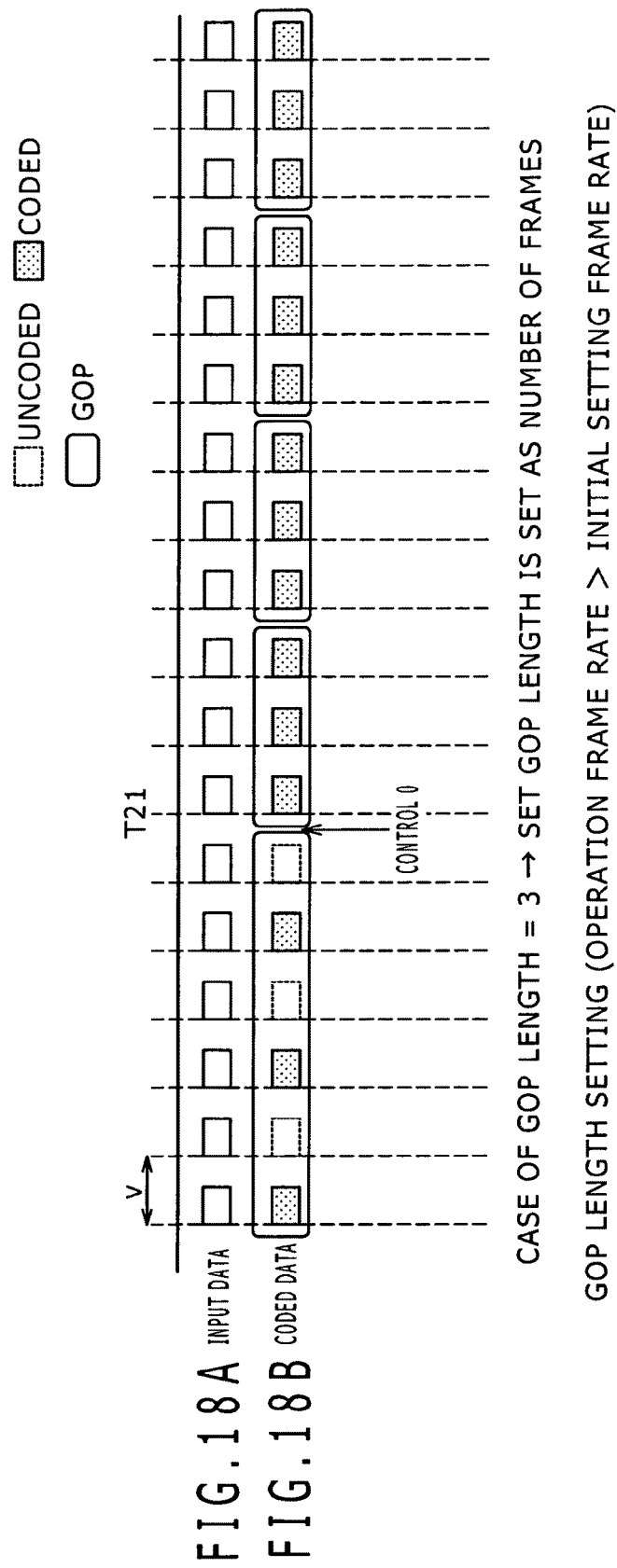

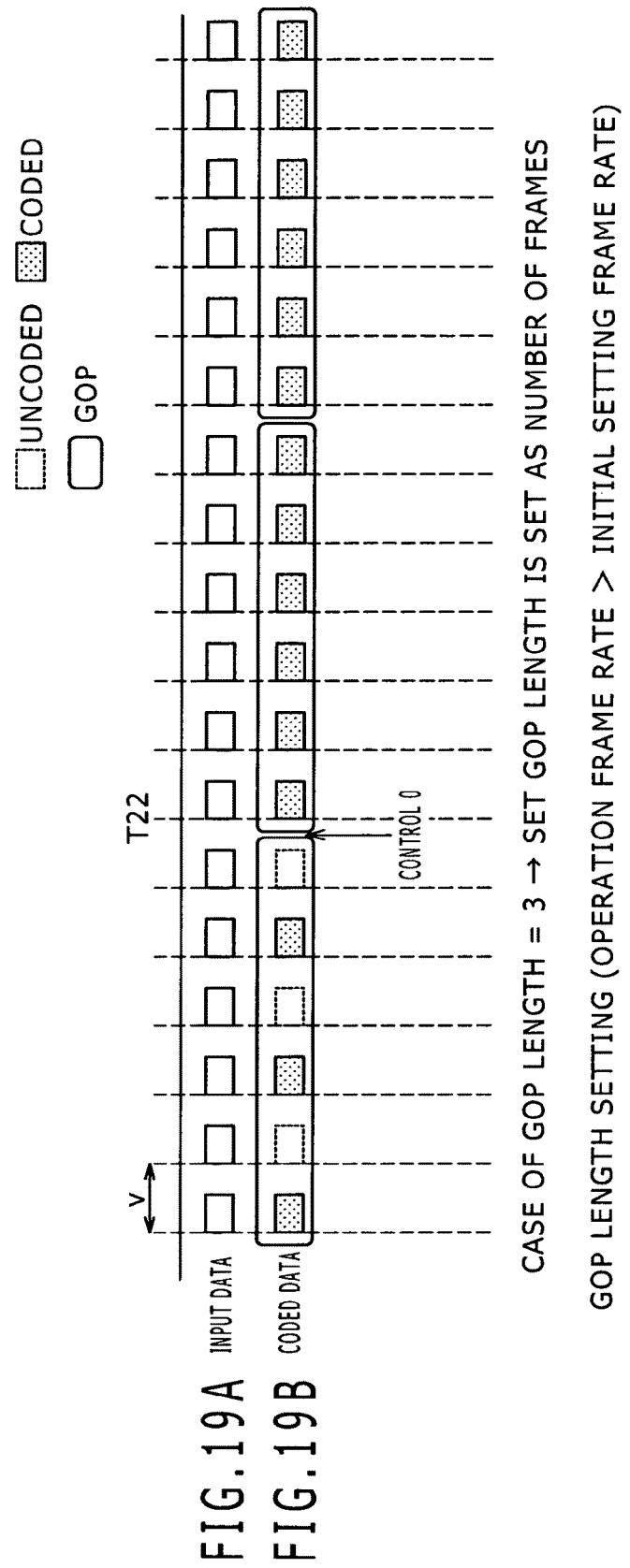

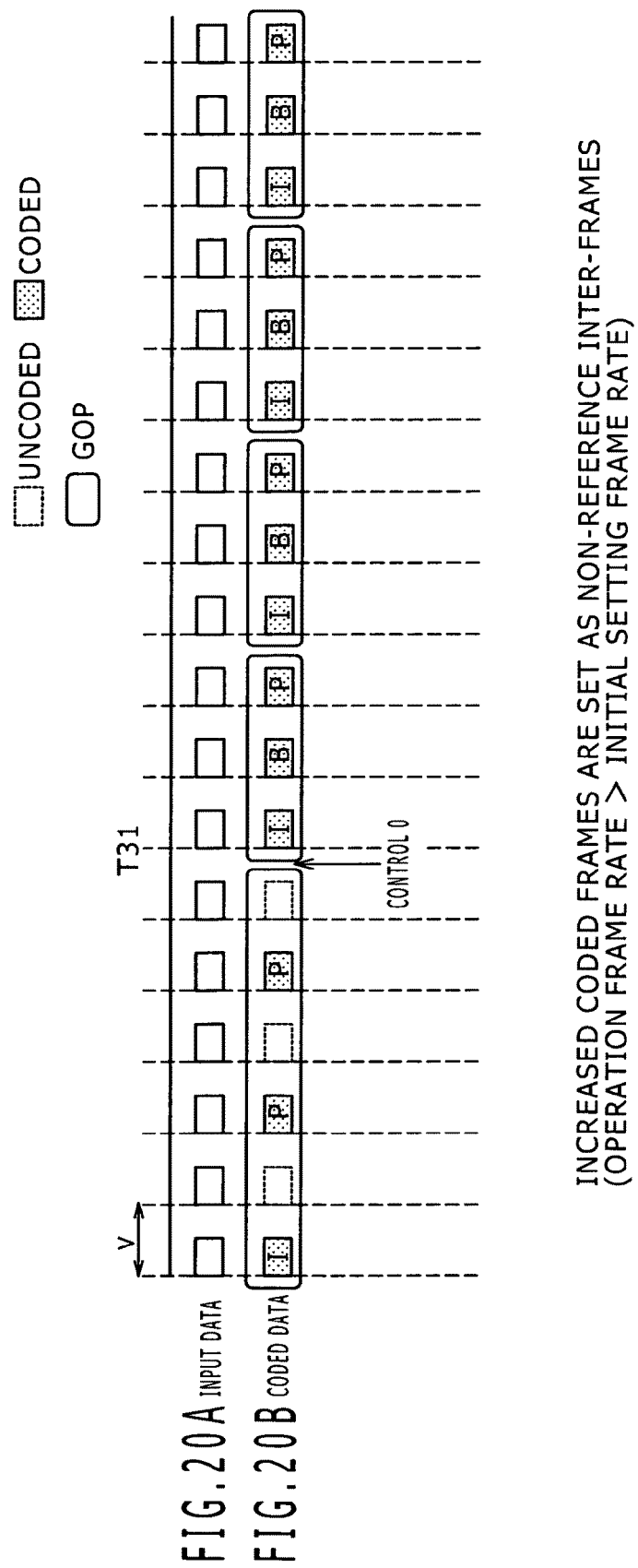

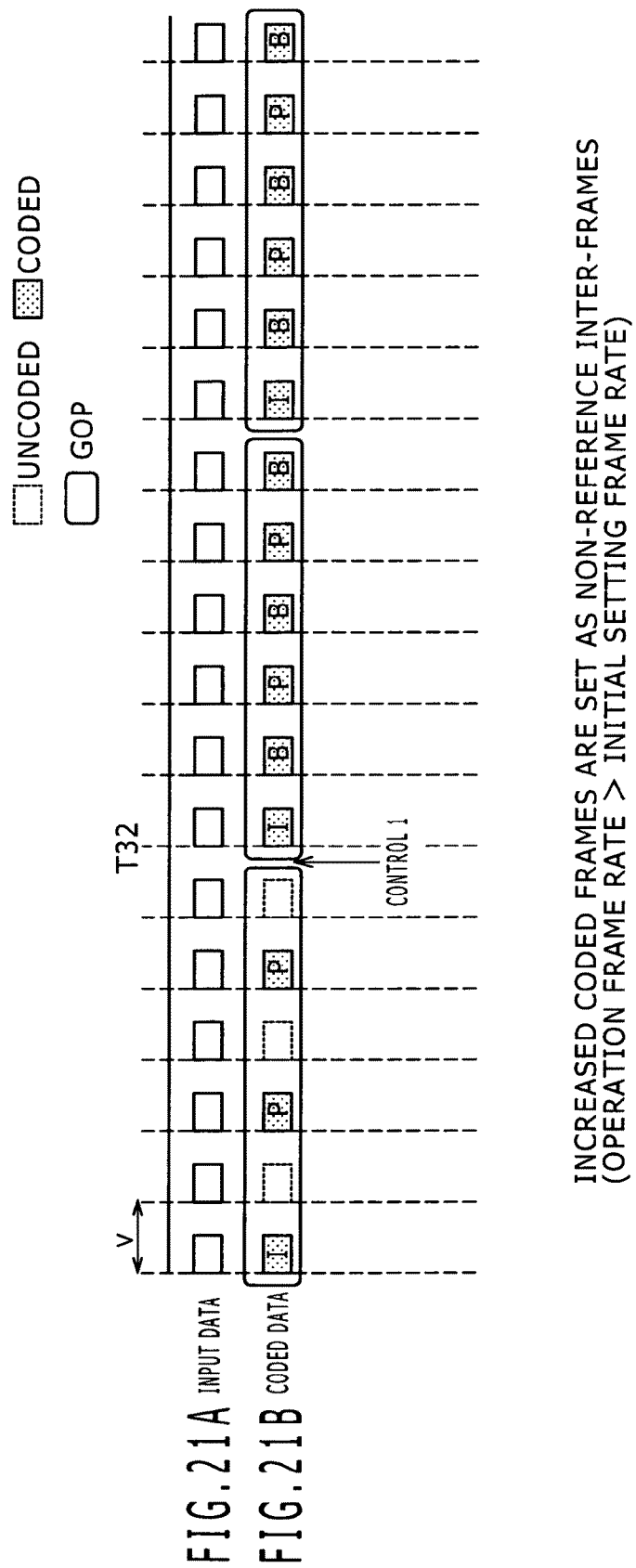

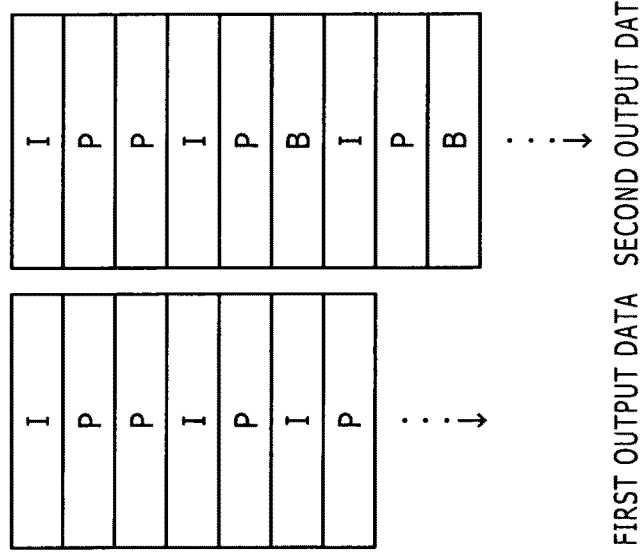

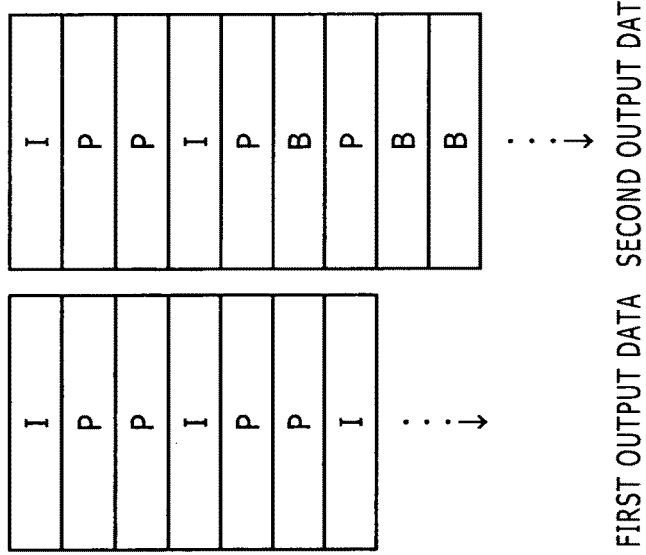

CODING DEVICE, IMAGING DEVICE, CODING TRANSMISSION SYSTEM, AND CODING METHOD

BACKGROUND

The present disclosure relates to a coding device and a coding method for moving image data including a plurality of pieces of image data.

Moving image data including a plurality of pieces of image data is coded by a coding device (Japanese Patent Laid-Open Nos. 2008-236789 and 2000-050254 (hereinafter referred to as Patent Documents 1 and 2)).

The coding device codes the moving image data by a coding system conforming to a standard such as MPEG (Moving Picture Experts Group) 1, 2, or 4, H.264, or the like.

The coding device for example adjusts a quantization parameter such as a Qp value or the like, inserts skip data in macroblock units, or inserts skip frame data in frame units, according to coding conditions.

The coding device thereby performs the coding process while adjusting the data amount of coded moving image data.

SUMMARY

However, such a coding device may drop frame data according to the coding conditions so that the coded moving image data is a predetermined data amount.

For example, when the coding device predicts that the coded moving image data will exceed a predetermined transmission data amount while coding a plurality of frames of a moving image in order, the coding device skips frame data being processed or next frame data.

In addition, in Patent Document 1, a frame to be skipped is determined on the basis of relation to a preceding frame and a succeeding frame.

In addition, in Patent Document 2, a frame to be skipped is determined by judgment based on a video object and the like.

When frame data not to be coded is thus determined according to coding conditions or the like, the frame data of the coded moving image data is missing at irregular intervals.

When the moving image data having the frame data thus missing at irregular intervals is reproduced, frame intervals are not stable, and thus a condition occurs in which an image changes immediately or an image stops for a while during the reproduction.

When such a condition occurs, a viewer feels a sense of incongruity about the reproduced moving image.

The coding device is thus desired to reduce the sense of incongruity (unnaturalness) of a viewer which sense of incongruity (unnaturalness) is attendant on the discontinuity of the coded moving image data.

According to a first embodiment of the present disclosure, there is provided a coding device including: an obtaining section configured to obtain moving image data including a plurality of pieces of image data reproducible at a predetermined rate; a determining section configured to determine whether coding of each piece of image data of the moving image data obtained by the obtaining section is necessary, and output an indicating signal indicating image data set as a coding object or image data not set as a coding object; and a coding performing section configured to be supplied with the indicating signal, and code the plurality of pieces of image data obtained by the obtaining section while discretely reducing the image data according to determination of the determining section. The determining section determines whether the coding of each piece of image data is necessary such that reproduction intervals of a plurality of pieces of image data in coded moving image data coded by the coding performing section are stabilized.

According to the first embodiment, the determining section determines whether the coding of each piece of image data is necessary such that reproduction intervals of a plurality of pieces of image data in coded moving image data coded by the coding performing section are stabilized.

In addition, the coding performing section codes the plurality of pieces of image data obtained by the obtaining section while discretely reducing the image data according to determination of the determining section.

Thus, the reproduction intervals of the plurality of pieces of image data in the coded moving image data are stabilized.

According to a second embodiment of the present disclosure, there is provided an imaging device including: an imaging section configured to output moving image data including a plurality of pieces of image data obtained by imaging at a predetermined rate; and a coding section configured to code the moving image data. The coding section includes an obtaining section configured to obtain the moving image data output from the imaging section, a determining section configured to determine whether coding of each piece of image data of the moving image data obtained by the obtaining section is necessary, and output an indicating signal indicating image data set as a coding object or image data not set as a coding object, and a coding performing section configured to be supplied with the indicating signal, and code the plurality of pieces of image data obtained by the obtaining section while discretely reducing the image data according to determination of the determining section. The determining section determines whether the coding of each piece of image data is necessary such that reproduction intervals of a plurality of pieces of image data in coded moving image data coded by the coding performing section are stabilized.

According to a third embodiment of the present disclosure, there is provided a coding transmission system including: a coding section configured to code moving image data including a plurality of pieces of image data obtained by imaging at a predetermined rate; a transmitting section configured to transmit the coded moving image data coded by the coding section; a receiving section configured to receive the coded moving image data transmitted by the transmitting section; and a decoding section configured to decode the coded moving image data received by the receiving section. The coding section includes an obtaining section configured to obtain the moving image data output from an imaging section, a determining section configured to determine whether coding of each piece of image data of the moving image data obtained by the obtaining section is necessary, and output an indicating signal indicating image data set as a coding object or image data not set as a coding object, and a coding performing section configured to be supplied with the indicating signal, and code the plurality of pieces of image data obtained by the obtaining section while discretely reducing the image data according to determination of the determining section. The determining section determines whether the coding of each piece of image data is necessary such that reproduction intervals of a plurality of pieces of image data in coded moving image data coded by the coding performing section are stabilized.

According to a fourth embodiment of the present disclosure, there is provided a coding method including: an obtaining section of a coding device including the obtaining section, a determining section, and a coding performing section configured to code moving image data including a plurality of pieces of image data reproducible at a predetermined rate obtaining the moving image data; the determining section determining whether coding of each piece of image data of the obtained moving image data is necessary; and the coding performing section coding the image data of the obtained moving image data while discretely reducing the image data of the moving image data according to the determination. The determining section determines whether the coding of each piece of image data is necessary such that reproduction intervals of a plurality of pieces of image data in coded moving image data are stabilized.

According to the present disclosure, discontinuity does not occur easily in coded moving image data, and the sense of incongruity (unnaturalness) of a viewer can be reduced.

BRIEF DESCRIPTION OF THE DRAWINGS

FIG. 8 is a diagram of assistance in explaining the coding control operation of the coding control section in FIG. 1;

FIG. 9 represents an initializing process sequence of the coding device in FIG. 1;

FIGS. 10A and 10B are diagrams of assistance in explaining coding presence or absence information that the coding control section in FIG. 1 outputs to the video coding performing section;

FIG. 11 represents a typical coding process sequence of the input section and the video coding performing section in FIG. 1;

FIG. 12 represents a coding process sequence when the coding control section in FIG. 1 starts control;

FIG. 13 represents a coding process sequence after the coding control section in FIG. 1 starts control;

FIGS. 14A, 14B, and 14C are diagrams showing an example of changes in data amount of moving image data coded by the coding device in FIG. 1;

FIGS. 15A and 15B are diagrams of assistance in explaining an underflow suppressing control operation by the coding control section when coded moving image data underflows;

FIGS. 16A and 16B are diagrams of assistance in explaining an overflow suppressing control operation by the coding control section when coded moving image data overflows;

FIGS. 17A and 17B are diagrams of assistance in explaining a first example of moving image data coded by the coding device in FIG. 1;

FIGS. 18A and 18B are diagrams of assistance in explaining a second example of moving image data coded by the coding device in FIG. 1;

FIGS. 19A and 19B are diagrams of assistance in explaining a third example of moving image data coded by the coding device in FIG. 1;

FIGS. 20A and 20B are diagrams of assistance in explaining a fourth example of moving image data coded by the coding device in FIG. 1;

FIGS. 21A and 21B are diagrams of assistance in explaining a fifth example of moving image data coded by the coding device in FIG. 1;

FIGS. 22A and 22B are diagrams of assistance in explaining postprocessing operation by an output section in FIG. 1 (first example);

FIGS. 23A and 23B are diagrams of assistance in explaining postprocessing operation by the output section in FIG. 1 (second example);

DETAILED DESCRIPTION OF THE PREFERRED EMBODIMENTS

Preferred embodiments of the present disclosure will hereinafter be described with reference to the drawings.

Description will be made in the following order.
1. First Embodiment (Example of Coding Device)
2. Second Embodiment (Example of Coding Transmission System Having Imaging device)<

1. First Embodiment

Configuration of Coding Device 1

Figure 1:
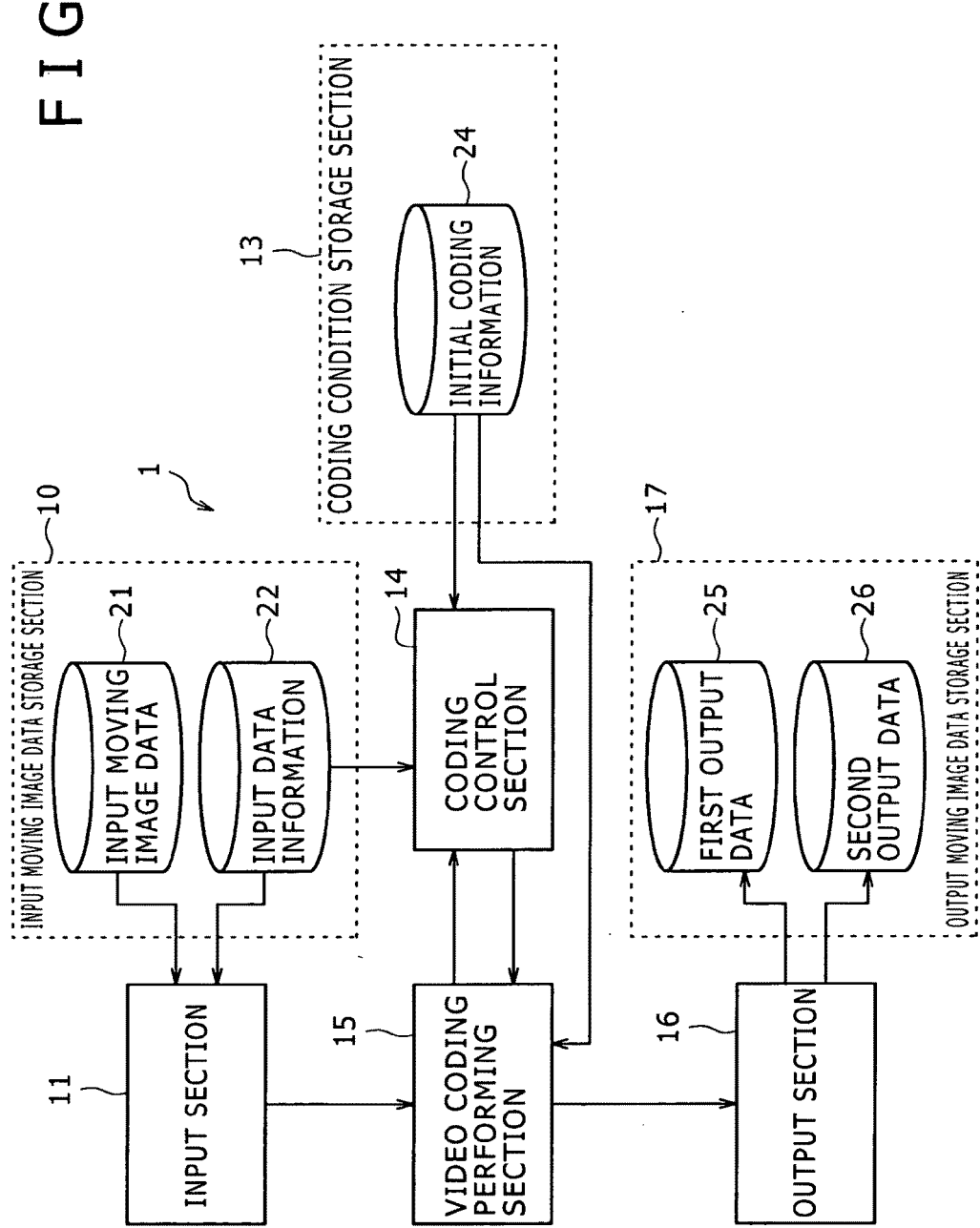
FIG. 1 is a schematic block diagram of a coding device according to a first embodiment of the present disclosure.

FIG. 1 is a schematic block diagram of a coding device 1 according to a first embodiment of the present disclosure.

The coding device 1 in FIG. 1 codes input moving image data.

The coding device 1 in FIG. 1 includes an input moving image data storage section 10, an input section 11, a coding condition storage section 13, a coding control section 14, a video coding performing section 15, an output section 16, and an output moving image data storage section 17.

Figure 2:
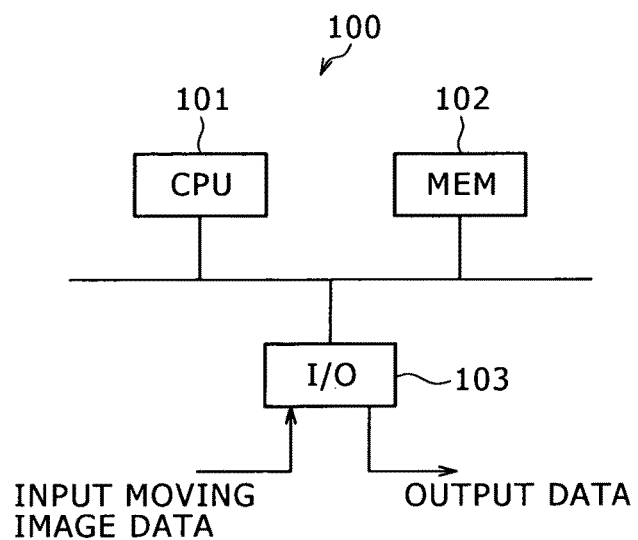
FIG. 2 is a block diagram of a computer device for implementing the coding device in FIG. 1.

FIG. 2 is a block diagram of a computer device 100 for implementing the coding device 1 in FIG. 1.

The computer device 100 in FIG. 2 has a CPU (Central Processing Unit) 101, a memory (MEM) 102, and an input-output section (I/O) 103.

The memory 102 stores a coding program.

The coding program stored in the memory 102 may be stored in the memory 102 before shipment of the computer device 100, or may be stored in the memory 102 after shipment of the computer device 100.

The coding program stored in the memory 102 after shipment of the computer device 100 may be for example obtained by reading a coding program recorded on a computer-readable recording medium or downloaded via a transmission medium such as the Internet or the like.

The CPU 101 reads and executes the coding program stored in the memory 102.

Thereby, the input section 11, the video coding performing section 15, and the output section 16 in FIG. 1 are implemented in the CPU 101.

In addition, the input moving image data storage section 10, the output moving image data storage section 17, and the coding condition storage section 13 are implemented in the memory 102.

Incidentally, in FIG. 2, the moving image data input to the coding device 1 is for example input from the input-output section 103 and stored in the memory 102.

In addition, coded moving image data generated by the coding device 1 is stored in the memory 102, and thereafter output from the input-output section 103 to the outside.

The input moving image data storage section 10 in FIG. 1 stores input moving image data 21 and input data information 22.

Figure 3:
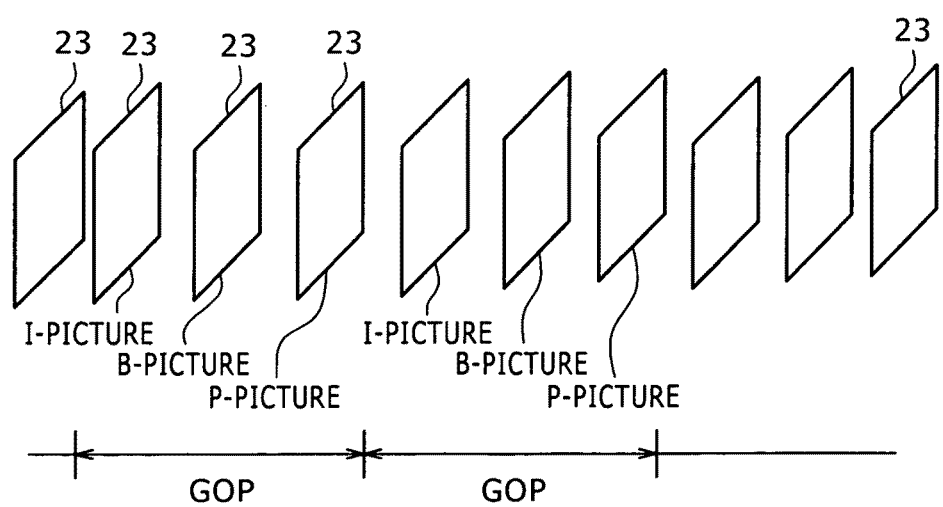
FIG. 3 is a diagram of assistance in explaining an example of moving image data to be coded by the coding device in FIG. 1.

FIG. 3 is a diagram of assistance in explaining an example of the input moving image data 21 to be coded by the coding device 1 in FIG. 1.

The input moving image data 21 in FIG. 3 has a plurality of pieces of frame data 23.

The frame data 23 in FIG. 3 is image data of still images reproducible at a certain frame rate. The plurality of pieces of frame data 23 in FIG. 3 are reproduced in order from a frame on a left side, for example.

The moving image data in FIG. 3 is coded in units of three frames, for example. A unit of this coding process is referred to as a GOP (Group Of Pictures).

In the example of FIG. 3, a first frame from the left in each GOP is coded as an I (Intra) picture. A second frame is coded as a B (Bidirectional predictive) picture. A third frame is coded as a P (Predictive) picture.

The input data information 22 is information on the input moving image data 21.

Such information includes for example information on the frame rate of the input moving image data 21 and information on a photographing environment in which the input moving image data 21 was taken.

In FIG. 1, the input section 11 is connected to the input moving image data storage section 10 and the video coding performing section 15.

The input section 11 obtains the input moving image data 21 and the input data information 22 from the input moving image data storage section 10.

The input section 11 outputs each piece of frame data 23 of the obtained input moving image data 21 to the video coding performing section 15.

At this time, the input section 11 determines output intervals of each piece of frame data 23 on the basis of the frame rate of the input moving image data 21 which frame rate is based on the input data information 22, and outputs the plurality of pieces of frame data 23 to the video coding performing section 15 at the output intervals.

Figure 4:
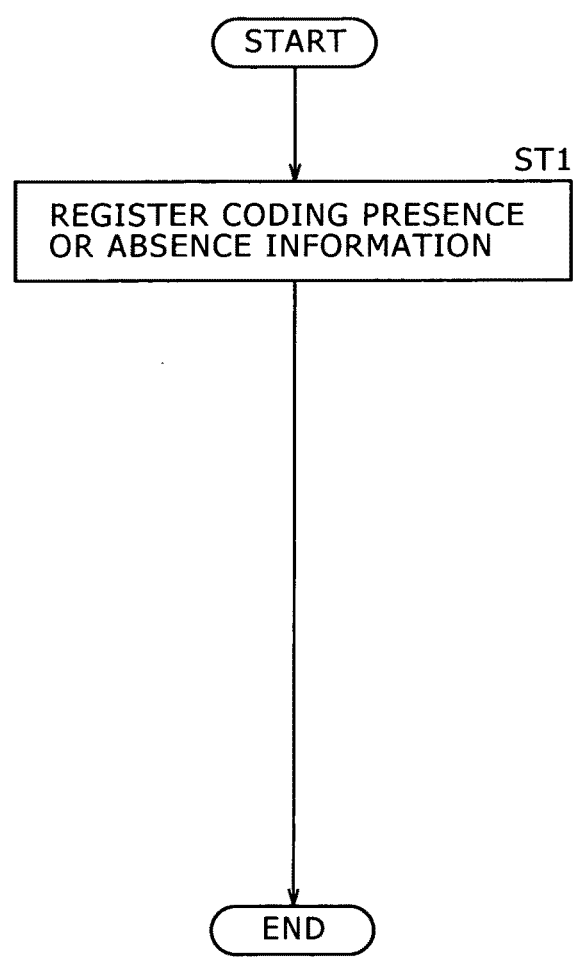
FIG. 4 is a flowchart of operation of an input section in FIG. 1.

FIG. 4 is a flowchart of operation of the input section 11 in FIG. 1.

FIG. 4 is a flowchart in a case where the input section 11 obtains the input moving image data 21 and the input data information 22 from the input-output section 103 in FIG. 2, for example.

Obtaining the input moving image data 21 and the input data information 22, the input section 11 stores the input moving image data 21 and the input data information 22 in the input moving image data storage section 10. In addition, the input section 11 stores coding presence or absence information in the input moving image data storage section 10 (step ST1).

The coding condition storage section 13 in FIG. 1 stores initial coding information 24 set in advance as coding conditions for the input moving image data 21.

Incidentally, the initial coding information 24 may be set in the coding device 1 in advance, or may be input from the outside via the input-output section 103 in FIG. 2, for example.

The initial coding information 24 includes for example information such as a profile, a level, the bit rate of coded moving image data, GOP length, the frame intervals of the coded moving image data, and the like, which are necessary for coding.

The GOP length indicates the number of frames (number of images) included in one GOP, for example.

The frame intervals are a recording frame rate when moving image data is recorded, for example.

The coding control section 14 is connected to the input moving image data storage section 10, the coding condition storage section 13, and the video coding performing section 15.

The coding control section 14 outputs an indicating signal to the video coding performing section 15 on the basis of the input data information 22 in the input moving image data storage section 10 and the initial coding information 24 in the coding condition storage section 13.

For example, the coding control section 14 indicates an initial frame rate for coding in the video coding performing section 15 on the basis of the frame rate of the input moving image data 21 and the frame rate of the initial coding information 24.

In addition, the coding control section 14 determines conditions of coding by the video coding performing section 15 on the basis of a notification signal input from the video coding performing section 15 in each cycle of the GOP length, for example.

In addition, the coding control section 14 updates the contents of the indicating signal according to a result of the determination.

For example, the coding control section 14 compares the data amount of the moving image data coded by the video coding performing section 15 with the data amount of a buffer 37 defined as a buffer storing the coded moving image data, and updates the indicating signal to contents corresponding to relation between these data amounts.

The coding control section 14 indicates whether each piece of frame data 23 of the input image data is image data set as a coding object or image data not set as a coding object.

The video coding performing section 15 is connected to the input section 11, the output section 16, the coding condition storage section 13, and the coding control section 14.

The video coding performing section 15 codes the frame data 23 input from the input section 11, and outputs the coded frame data 23 to the output section 16.

At this time, the video coding performing section 15 independently determines whether the coding of frame data 23 is necessary or not on the basis of the initial coding information 24 stored in the coding condition storage section 13, the indicating signal input from the coding control section 14, and coding conditions (the data amount of the coded moving image data and the like).

In addition, the video coding performing section 15 independently determines a frame coding system, a parameter (coding variable), and the like.

Then, the video coding performing section 15 codes the frame data 23 input from the input section 11 according to the determinations of the video coding performing section 15 itself, and outputs the coded frame data 23 to the output section 16.

In addition, the video coding performing section 15 outputs the notification signal for notifying the data amount of the coded moving image data to the coding control section 14 in each cycle corresponding to the GOP length.

Figure 5:
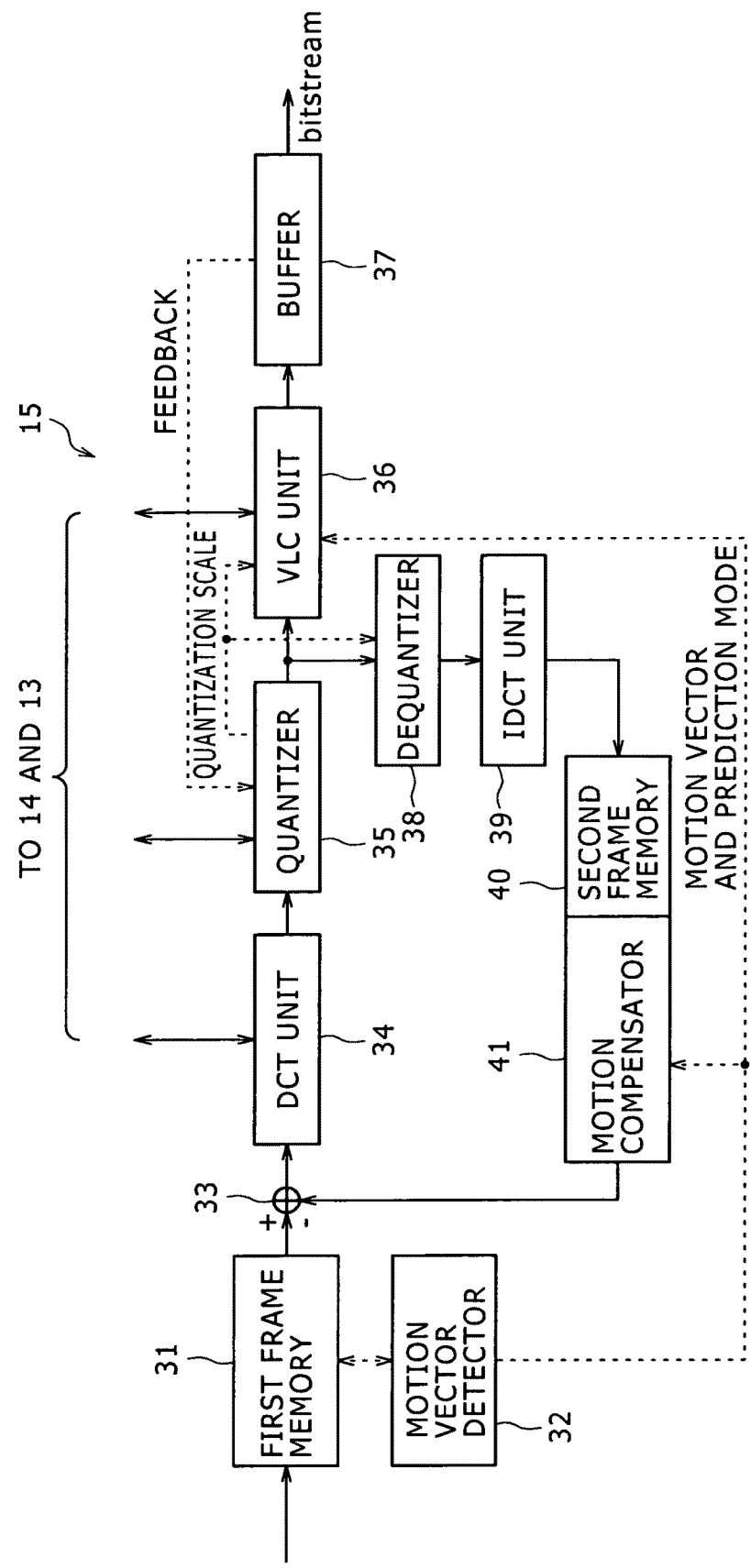
FIG. 5 is a block diagram of a video coding performing section in FIG. 1.

FIG. 5 is a block diagram of the video coding performing section 15 in FIG. 1.

The video coding performing section 15 in FIG. 5 codes moving image data by an MPEG-4 visual system.

The video coding performing section 15 in FIG. 5 has a first frame memory 31, a motion vector detector 32, a subtracter 33, a DCT (Discrete Cosine Transform) unit 34, and a quantizer 35.

The video coding performing section 15 in FIG. 5 also has a VLC (Variable Length Code) unit 36 and a buffer 37.

The video coding performing section 15 in FIG. 5 also has a dequantizer 38, an IDCT (Inverse DCT) unit 39, a second frame memory 40, and a motion compensator 41.

The first frame memory 31 stores an image based on frame data 23 output from the input section 11.

The motion vector detector 32 is connected to the first frame memory 31.

The motion vector detector 32 detects a motion vector of an object common to an image of other frame data 23 for a new coding object image stored in the first frame memory 31.

The subtracter 33 is connected to the first frame memory 31 and the motion compensator 41. The subtracter 33 subtracts an image stored in the second frame memory 40 and resulting from compensation processing by the motion compensator 41 from the image stored in the first frame memory 31.

The DCT unit 34 is connected to the subtracter 33. The DCT unit 34 subjects each of predetermined blocks of an image resulting from the differential operation by the subtracter 33 to a discrete cosine transform.

The quantizer 35 is connected to the DCT unit 34. The quantizer 35 quantizes DCT coefficients of each frequency band which coefficients are obtained by the discrete cosine transform in each block by the DCT unit 34.

The VLC unit 36 is connected to the quantizer 35. The VLC unit 36 subjects the DCT coefficient data quantized by the quantizer 35 to variable length coding. The VLC unit 36 outputs the coded data to the buffer 37.

The buffer 37 thereby stores the coded frame data 23. The coded frame data 23 is output from this buffer 37 to the output section 16 in FIG. 1.

The VLC unit 36 is also connected to the motion vector detector 32. The VLC unit 36 outputs data on a motion vector detected by the motion vector detector 32 to the buffer 37.

In addition, the DCT unit 34, the quantizer 35, and the VLC unit 36 read the indicating signal of the coding control section 14 and the initial coding information 24 in the coding condition storage section 13 in a series of coding processes.

The DCT unit 34, the quantizer 35, and the VLC unit 36 adjust for example a block size, a degree of quantization, and a coding method on the basis of the indicating signal of the coding control section 14 and the initial coding information 24 in the coding condition storage section 13.

The quantizer 35 also reads the data amount of the coded frame data 23 stored in the buffer 37.

The quantizer 35 determines for example whether the coding of frame data 23 is necessary or not on the basis of an independent decision according to the data amount.

The dequantizer 38 is connected to the quantizer 35. The dequantizer 38 generates DCT coefficients for the quantized frame data 23 from DCT coefficients after being quantized by the quantizer 35.

The IDCT unit 39 is connected to the dequantizer 38. The IDCT unit 39 generates an image of the quantized frame data 23 from the DCT coefficients generated by the dequantizer 38.

The second frame memory 40 stores the image of the quantized frame data 23.

The motion compensator 41 is connected to the motion vector detector 32 and the second frame memory 40.

The motion compensator 41 generates an image obtained by moving the image stored in the second frame memory 40 on the basis of a motion vector detected by the motion vector detector 32.

The output section 16 in FIG. 1 is connected to the video coding performing section 15 and the output moving image data storage section 17.

The output section 16 stores the coded frame data 23 input from the video coding performing section 15 in the output moving image data storage section 17.

The output moving image data storage section 17 thereby stores the frame data 23 coded by the video coding performing section 15.

The output moving image data storage section 17 stores first output data 25 and second output data 26 as moving image data obtained by coding the same input moving image data 21 as illustrated in FIG. 3.

[Coding Operation of Coding Performing Section in FIG. 1]

Figure 6:
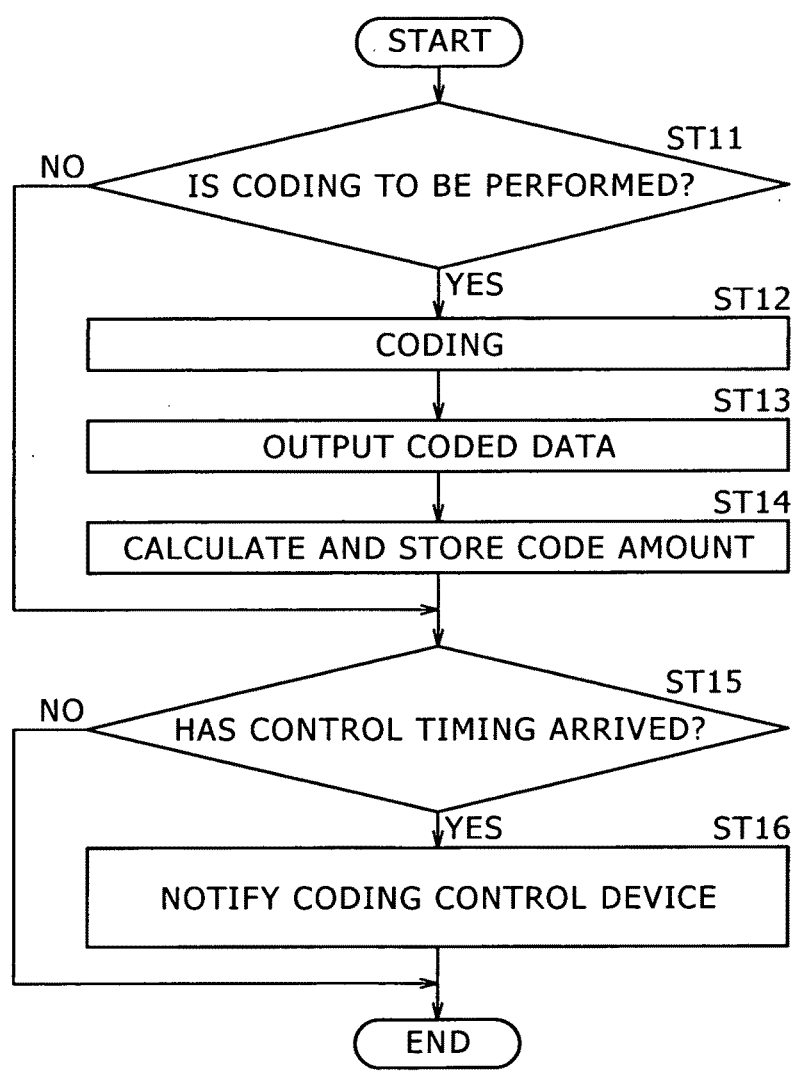
FIG. 6 is a flowchart of a coding operation for each piece of frame data by the video coding performing section in FIG. 1.

FIG. 6 is a flowchart of a coding operation for each piece of frame data 23 by the video coding performing section 15 in FIG. 1.

The video coding performing section 15 performs a coding process of FIG. 6 each time frame data 23 is input from the input section 11 according to the frame rate of the input frame data 23.

In the coding process for each piece of frame data 23, the video coding performing section 15 first determines whether to code frame data 23 involved in the coding process (step ST11).

For example, when an indicating signal to an effect that the frame data 23 in question is not to be coded is input from the coding control section 14, the video coding performing section 15 in principle determines that the frame data 23 is not to be coded.

However, when the video coding performing section 15 reads the data amount of coded frame data 23 from the buffer 37, and determines that the buffer 37 will become empty when the frame data 23 in question is not coded, the video coding performing section 15 determines that the frame data 23 is to be coded.

In addition, for example, when an indicating signal to an effect that the frame data 23 in question is to be coded is input from the coding control section 14, the video coding performing section 15 in principle determines that the frame data 23 is to be coded.

However, when the video coding performing section 15 reads the data amount of the coded frame data 23 from the buffer 37, and determines that the buffer 37 will become full when the frame data 23 in question is coded, the video coding performing section 15 determines that the frame data 23 is not to be coded.

When determining that the frame data 23 is to be coded, the video coding performing section 15 performs the process of coding the frame data 23 (step ST12).

The video coding performing section 15 outputs the coded frame data 23 from the buffer 37 in FIG. 5 (step ST13).

In addition, the video coding performing section 15 calculates and stores the data amount of the coded frame data 23 (step ST14).

After coding the frame data 23, the video coding performing section 15 determines whether timing of processing of the frame data 23 in question is timing of outputting a notification signal to the coding control device (step ST15).

Also when the frame data 23 as a coding processing object is not coded, the video coding performing section 15 determines whether timing of processing of the frame data 23 in question is timing of outputting a notification signal to the coding control device (step ST15).

For example, when coding is performed according to GOPs as units of three frames as shown in FIG. 2, for example, the video coding performing section 15 determines that timing of outputting a notification signal arrives when a last P-picture of each GOP is coded. The video coding performing section 15 determines that timing of outputting a notification signal does not arrive when other pictures are coded.

When timing of outputting a notification signal arrives, the video coding performing section 15 notifies the data amount of the coded frame data 23 to the coding control device (step ST16). In the case of FIG. 2, the video coding performing section 15 notifies a total data amount of three pieces of frame data 23 coded in each GOP to the coding control device when a last P-picture of each GOP composed of three frames is coded.

The video coding performing section 15 thereby ends the coding process. In addition, when timing of outputting a notification signal has not arrived, the video coding performing section 15 ends the coding process.

[Coding Control Operation of Coding Control Section 14 in FIG. 1]

Figure 7:
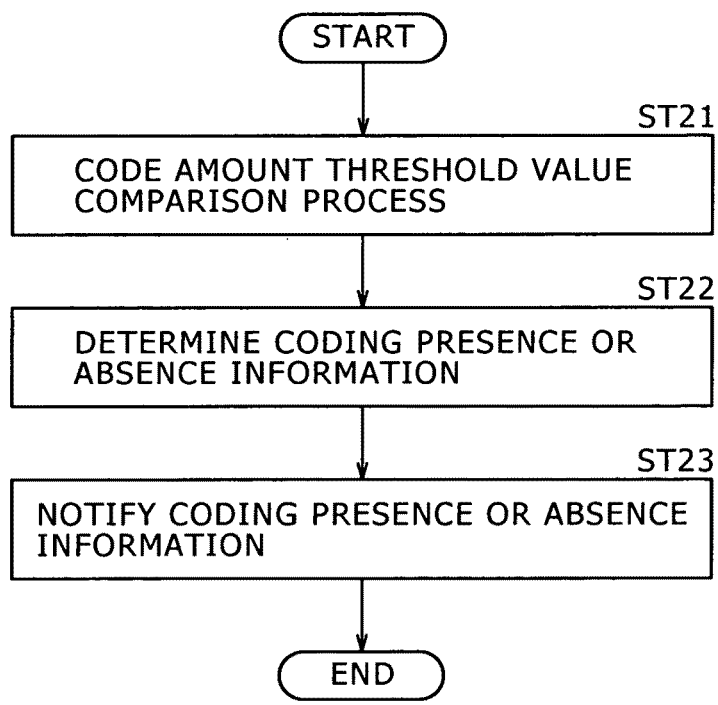
FIG. 7 is a flowchart of coding control operation of a coding control section in FIG. 1.

FIG. 7 is a flowchart of coding control operation of the coding control section 14 in FIG. 1.

The coding control section 14 performs the coding control operation of FIG. 7 each time a notification signal is input from the video coding performing section 15, for example. In the example of FIG. 6, the video coding performing section 15 outputs a notification signal to the coding control section 14 when the video coding performing section 15 has coded a last picture of each GOP.

In the coding control operation, the coding control section 14 first compares an obtained code amount with a threshold value in a predetermined buffer model 51 (step ST21).

Next, the coding control section 14 determines the ratio of frame data 23 to be coded within a predetermined period on the basis of a result of the comparison of the code amount, and selects frame data 23 to be set as objects for coding from a plurality of pieces of frame data 23 within the predetermined period according to the ratio (step ST22).

Next, the coding control section 14 outputs the predetermined period and an indicating signal for indicating the selected frame data 23 set as objects for coding to the video coding performing section 15 (step ST23). The coding control section 14 indicates for example GOP length for the input moving image data 21 and frame data 23 set as coding objects or frame data 23 not set as coding objects within a GOP in question.

FIG. 8 is a diagram of assistance in explaining the coding control operation of the coding control section 14 in FIG. 1.

FIG. 8 shows the buffer model 51 conforming to an MPEG-4 visual standard. An axis of ordinates indicates an amount of data retained within the buffer model 51. Incidentally, the buffer 37 in FIG. 5 corresponds to this buffer model 51.

Incidentally, the retained data refers to data coded by the video coding performing section 15 and not processed by the output section 16 in the subsequent stage.

A VBV (Video Buffer Verifier) in FIG. 8 is a buffer occupation amount defined in the MPEG-4 visual standard. According to the MPEG-4 visual standard, an amount of coded data is desired to be controlled such that the amount of data retained within the buffer model 51 falls within a range of 0% to 100% of a VBV value.

When the buffer occupation amount is 0%, the buffer model 51 is full, and is in an underflow state.

When the buffer occupation amount is 100%, the buffer model 51 is empty, and is in an overflow state.

When the video coding performing section 15 in FIG. 1 predicts that the amount of data retained within the buffer model 51 will become less than 0% of the VBV value, for example, the video coding performing section 15 performs control for reducing the data amount according to an own judgment of the video coding performing section 15. The video coding performing section 15 for example stops and skips the coding of frame data 23 according to an own judgment of the video coding performing section 15.

In addition, when the video coding performing section 15 predicts that the amount of data retained within the buffer model 51 will exceed 100% of the VBV value, the video coding performing section 15 performs control for increasing the data amount according to an own judgment of the video coding performing section 15. The video coding performing section 15 for example codes frame data 23 to be skipped according to an own judgment of the video coding performing section 15.

On the other hand, the coding control section 14 controls the coding operation of the video coding performing section 15 on the basis of an overflow suppressing threshold value 52, a threshold value 53 of 80% of the VBV value, a threshold value 54 of 40% of the VBV value, and an underflow suppressing threshold value 55.

The overflow suppressing threshold value 52 is set between the VBV value and the threshold value 53 of 80% of the VBV value.

The underflow suppressing threshold value 55 is set between zero and the threshold value 54 of 40% of the VBV value.

Incidentally, these values are stored as initial coding information 24 in the coding condition storage section 13, for example. In addition, each value can be set as appropriate by changing the initial coding information 24.

When the retained data amount is within a range of 80% to 40% of the VBV value, the coding control section 14 does not adjust a code amount. The coding control section 14 outputs an indicating signal having the same contents as an indicating signal already output to the video coding performing section 15 to the video coding performing section 15.

When the retained data amount is not within the range of 80% to 40% of the VBV value, on the other hand, the coding control section 14 adjusts the code amount. The coding control section 14 outputs an indicating signal having different contents from those of an indicating signal already output to the video coding performing section 15 to the video coding performing section 15.

Specifically, in the case of FIG. 8, when the retained data amount is within a range of 80% of the VBV value to the overflow suppressing threshold value 52, the coding control section 14 adjusts the code amount so as to decrease the code amount by one step. The coding control section 14 for example lengthens a predetermined period (GOP length) by one step or decreases the number of pieces or the ratio of frame data 23 to be coded within a GOP by one step.

In addition, when the retained data amount is within a range of the overflow suppressing threshold value 52 to 100% of the VBV value, the coding control section 14 adjusts the code amount so as to decrease the code amount by two steps. The coding control section 14 for example lengthens the predetermined period by two steps or decreases the number of pieces or the ratio of frame data 23 to be coded within a GOP by two steps.

In addition, when the retained data amount is within a range of 40% of the VBV value to the underflow suppressing threshold value 55, the coding control section 14 adjusts the code amount so as to increase the code amount by one step. The coding control section 14 for example shortens the predetermined period by one step or increases the number of pieces or the ratio of frame data 23 to be coded within a GOP by one step.

In addition, when the retained data amount is within a range of the underflow suppressing threshold value 55 to 0% of the VBV value, the coding control section 14 adjusts the code amount so as to increase the code amount by two steps. The coding control section 14 for example shortens the predetermined period by two steps or increases the number of pieces or the ratio of frame data 23 to be coded within a GOP by two steps.

After determining the GOP length and the frame data 23 to be coded within a GOP, the coding control section 14 outputs an indicating signal.

The coding control section 14 selects frame data 23 as coding objects which frame data 23 is included in the input moving image data 21 such that the intervals of the frame data 23 to be coded under the determined condition are equal intervals, and outputs the indicating signal based on the selection.

The coding control section 14 for example selects the frame rate of moving image data to be coded from the frame rate of the input moving image data 21 and divisors (or multiples) of the frame rate of the input moving image data 21, and selects the frame data 23 as coding objects on the basis of the selected frame rate.

Thereby, the frame rate of moving image data coded on the basis of the instruction of the coding control section 14 is switched between $\frac{1}{60}$ of a second, $\frac{1}{30}$ of a second, $\frac{1}{20}$ of a second, $\frac{1}{15}$ of a second, $\frac{1}{12}$ of a second, $\frac{1}{5}$ of a second, $\frac{1}{4}$ of a second, $\frac{1}{3}$ of a second, $\frac{1}{2}$ of a second, and one second, for example.

In addition, on the basis of such a control instruction, the video coding performing section 15 selects frame data 23 to be coded, and codes the frame data 23.

Suppose for example that the frame rate of coded moving image data when an amount of coding is not adjusted is $\frac{1}{15}$ of a second. In this case, a one-step decrease instruction changes the frame rate of the coded moving image data to $\frac{1}{30}$ of a second. A two-step decrease instruction changes the frame rate of the coded moving image data to $\frac{1}{60}$ of a second. In addition, a one-step increase instruction changes the frame rate of the coded moving image data to $\frac{1}{12}$ of a second. A two-step increase instruction changes the frame rate of the coded moving image data to $\frac{1}{5}$ of a second.

[Overall Operation of Coding Device 1 in FIG. 1]

An overall operation of the coding device 1 in FIG. 1 will next be described.

A normal operation will first be described.

FIG. 9 represents an initializing process sequence of the coding device 1 in FIG. 1.

In FIG. 9, when input data information 22 is stored in the input moving image data storage section 10, the input section 11 reads the input data information 22.

The input section 11 determines frame intervals of input moving image data 21 at which frame intervals the frame data 23 of the input moving image data 21 is output to the video coding performing section 15, and internally retains the frame intervals (step ST31).

The coding control section 14 reads the input data information 22 from the input moving image data storage section 10, and internally stores the frame intervals of the input moving image data 21 (step ST32).

The video coding performing section 15 reads initial coding information 24 from the coding condition storage section 13, determines a codec type, a profile, a level, a bit rate, a frame rate, GOP length, and the like which are necessary for coding, and prepares for coding (step ST33).

The coding control section 14 reads the initial coding information 24 from the coding condition storage section 13.

The coding control section 14 calculates coding presence or absence information from the frame intervals calculated from the coding frame rate and the previously stored frame intervals of the input moving image data 21, adjusts control timing, and outputs the coding presence or absence information and the control timing (step ST34).

The video coding performing section 15 internally stores the coding presence or absence information and the control timing determined by the coding control section (step ST35).

FIGS. 10A and 10B are diagrams of assistance in explaining the coding presence or absence information that the coding control section 14 in FIG. 1 outputs to the video coding performing section 15.

A plurality of pieces of frame data 23 of the input moving image data 21 in FIG. 10A have fixed frame intervals.

In the example of FIG. 10B, a plurality of pieces of frame data 23 of moving image data according to the coding presence or absence information have fixed frame intervals obtained by discretely reducing the input moving image data 21 alternately.

In addition, in a case of a GOP length of "3," the period of six pieces of frame data 23 of the input moving image data 21 is a period corresponding to the GOP length. In addition, three pieces of frame data 23 alternately selected from the six pieces of frame data 23 are coded.

FIG. 11 represents a typical coding process sequence of the input section 11 and the video coding performing section 15 in FIG. 1.

When input moving image data 21 is stored in the input moving image data storage section 10, the input section 11 reads the input moving image data 21, and outputs the input moving image data 21 to the video coding performing section 15. The input section 11 outputs a plurality of pieces of unprocessed frame data 23 to the video coding performing section 15 one by one in order at frame intervals set in advance (steps ST41-1 to ST41-4).

When the frame data 23 is input, the video coding performing section 15 determines whether coding is necessary or not on the basis of the coding presence or absence information and the like. When coding is to be performed, the video coding performing section 15 codes the frame data 23 on the basis of the coding information provided in advance, and outputs the coded frame data 23 to the output section 16 (steps ST42-1 to ST42-4).

When the coded frame data 23 is input, the output section 16 stores the frame data 23 in the output moving image data storage section 17 (steps ST43-1 to ST43-4).

The video coding performing section 15 and the output section 16 repeat the above process each time frame data 23 is output from the input section 11. The output moving image data storage section 17 thereby stores first output data 25 formed by a plurality of pieces of coded frame data 23.

The video coding performing section 15 independently determines whether the coding of each piece of frame data 23 is necessary or not as shown in FIG. 6 when performing the coding process for each piece of frame data 23.

The video coding performing section 15 compares the data amount of the coded data (frame data 23 and the like) output to the output section 16 with the data amount of the buffer model 51. The video coding performing section 15 then adjusts a code amount according to a result of the data amount comparison to conform to transitions of control of the buffer 37 as defined by a moving image standard. The video coding performing section 15 for example adjusts a quantization parameter such as a Qp value or the like, inserts skip data in macroblock units, or inserts skip frame data 23.

As a result, the video coding performing section 15 may code frame data 23 or may not code the frame data 23 according to an own judgment of the video coding performing section 15 regardless of the instruction of the coding control section 14 which instruction indicates that the coding of the frame data 23 is necessary or not.

When the video coding performing section 15 thus makes a final judgment on whether the coding of frame data 23 is necessary or not according to the amount of data remaining in the buffer 37, frame intervals of a plurality of pieces of coded image data in coded moving image data are not fixed.

As a result, when the coded moving image data is reproduced, an image immediately changes or the image appears to be stopped for a while during the reproduction. The image becomes an unstable image.

The frame intervals of a plurality of pieces of coded image data of the coded moving image data controlled by the video coding performing section 15 repeatedly as to whether the coding of the frame data 23 is necessary or not may become unstable.

A viewer feels a sense of incongruity about such a moving image.

FIG. 12 represents a coding process sequence when the coding control section 14 in FIG. 1 starts control.

A basic process flow is similar to that of FIG. 11, and steps in which a similar process is performed are identified by the same reference numerals.

Each time frame data 23 is input, the video coding performing section 15 calculates a code amount after coding the frame data 23 in question in the buffer model 51 conforming to a standard, and internally retains the code amount (steps ST42-1 to ST42-4).

When timing of an end of coding each GOP arrives, the video coding performing section 15 outputs a notification signal including the internally retained code amount after the coding to the coding control section 14 (step ST44).

When the notification signal is input, the coding control section 14 compares the notified obtained code amount with each threshold value in the buffer model 51 in FIG. 8 (step ST45). In addition, the coding control section 14 generates coding presence or absence information for each piece of frame data 23 according to a result of the comparison, and outputs the coding presence or absence information as an indicating signal to the video coding performing section 15 (step ST46).

The video coding performing section 15 internally retains the new coding presence or absence information received (step ST47).

FIG. 13 represents a coding process sequence after the coding control section 14 in FIG. 1 starts control.

A basic process flow is similar to that of FIG. 11, and steps in which a similar process is performed are identified by the same reference numerals.

However, the video coding performing section 15 determines whether the coding of each piece of frame data 23 is necessary or not on the basis of the new coding presence or absence information indicated in FIG. 12, and performs a coding process.

Thus, when an instruction to code one piece of frame data out of every two pieces of frame data is given, for example, the video coding performing section 15 does not output coded frame data to the output section 16 as shown in steps ST42-2 and ST42-4 in FIG. 13.

[Example of Coded Image Data]

FIGS. 14A, 14B, and 14C are diagrams showing an example of changes in data amount of moving image data coded by the coding device 1 in FIG. 1.

FIG. 14A is a diagram showing input moving image data 21. FIG. 14B is a diagram showing coded moving image data. FIG. 14C is a diagram showing an MPEG-4 visual buffer occupation amount. In FIGS. 14A to 14C, time passes from a left to a right.

In FIGS. 14A to 14C, all pieces of frame data 23 of the input moving image data 21 are coded at first.

However, as shown in FIG. 14C, the buffer occupation amount changes toward an underflow.

In this case, the coding control section 14 updates the indicating signal in timing T1. The video coding performing section 15 thereby switches so as to code every second piece of frame data 23 of the input moving image data 21. The video coding performing section 15 codes one piece of frame data in each period of 2V.

In the case of FIGS. 14A to 14C, the buffer occupation amount changes toward an underflow also after the first instruction change.

In this case, the coding control section 14 further updates the indicating signal in timing T2. The video coding performing section 15 thereby switches so as to code every third piece of frame data 23 of the input moving image data 21. The video coding performing section 15 codes one piece of frame data in each period of 3V.

FIGS. 15A and 15B are diagrams of assistance in explaining an underflow suppressing control operation by the coding control section 14 when coded moving image data underflows.

FIG. 15A is a diagram showing a buffer occupation amount. FIG. 15B is an enlarged view of a period of T3 to T4 in FIG. 15A.

In FIG. 15A, the VBV occupation amount becomes less than an underflow suppressing threshold value 55 in timing T3. In this case, as shown in FIG. 15B, frame intervals of frame data 23 as coding objects are changed to frame intervals of every third piece of frame data 23.

As a result, the VBV occupation amount is prevented from being further decreased after timing T3. That is, the VBV occupation amount is prevented from being decreased to a level estimated to be an underflow level by the video coding performing section 15.

FIGS. 16A and 16B are diagrams of assistance in explaining an overflow suppressing control operation by the coding control section 14 when coded moving image data overflows.

FIG. 16A is a diagram showing a buffer occupation amount. FIG. 16B is an enlarged view of a period of T5 to T6 in FIG. 16A.

In FIG. 16A, the VBV occupation amount exceeds an overflow suppressing threshold value 52 in timing T7. In this case, as shown in FIG. 16B, frame intervals of frame data 23 as coding objects are changed from frame intervals of every second piece of frame data 23 to frame intervals of each piece of frame data 23.

As a result, the VBV occupation amount is prevented from being further increased after timing T7. That is, the VBV occupation amount is prevented from being increased to a level estimated to be an overflow level by the video coding performing section 15.

FIGS. 17A to 21B are diagrams of assistance in explaining a first example of moving image data coded by the coding device 1 in FIG. 1.

FIGS. 17A to 21A are diagrams showing input moving image data 21. FIGS. 17B to 21B are diagrams showing coded moving image data. In the figures, V denotes a frame period of the input moving image data 21.

FIGS. 17A and 17B represent an example in which the frame rate of coded moving image data is changed while the GOP length of the coded moving image data remains fixed at three.

The coding control section 14 gives an instruction to perform the operation of FIGS. 17A and 17B when a coding operation frame rate is equal to or lower than an initial setting frame rate. FIGS. 17A and 17B represent an example of control being performed with the set GOP length converted to the number of frames within a GOP.

Specifically, on the basis of an indicating signal in timing T11, the operation of coding frame data 23 by the video coding performing section 15 is changed from a process of coding each piece of frame data 23 to a process of coding every second piece of frame data 23 while the GOP length is maintained at three.

In addition, on the basis of an indicating signal in timing T12, the operation of coding frame data 23 by the video coding performing section 15 is changed from the process of coding every second piece of frame data 23 to a process of coding every third piece of frame data 23 while the GOP length is maintained at three. The reproduction intervals of a plurality of coded image data are thereby widened.

FIGS. 18A and 18B represent another example in which the frame rate of coded moving image data is changed while the GOP length of the coded moving image data remains fixed at three. The coding control section 14 gives an instruction to perform the operation of FIGS. 18A and 18B when the operation frame rate exceeds the initial setting frame rate. FIGS. 18A and 18B represent an example of control being performed with the set GOP length converted to the number of frames within a GOP.

Specifically, on the basis of an indicating signal in timing T21, the operation of coding frame data 23 by the video coding performing section 15 is changed from the process of coding every second piece of frame data 23 to the process of coding each piece of frame data 23 while the GOP length is maintained at three. The reproduction intervals of a plurality of coded image data are thereby narrowed.

FIGS. 19A and 19B represent another example of a frame rate change indicated by the coding control section 14 when the operation frame rate exceeds the initial setting frame rate. FIGS. 19A and 19B represent an example of control being performed with the set GOP length converted to time.

Specifically, on the basis of an indicating signal in timing T22, the operation of coding frame data 23 by the video coding performing section 15 is changed from the process of coding every second piece of frame data 23 to the process of coding each piece of frame data 23 while the period of each GOP for the input moving image data 21 is maintained.

FIGS. 20A and 20B represent another example in which the frame rate of coded moving image data is changed while the GOP length of the coded moving image data remains fixed at three. The coding control section 14 gives an instruction to perform the operation of FIGS. 20A and 20B when the operation frame rate exceeds the initial setting frame rate. FIGS. 20A and 20B represent an example of control being performed with the set GOP length converted to the number of frames within a GOP.

Specifically, on the basis of an indicating signal in timing T31, the operation of coding frame data 23 by the video coding performing section 15 is changed from the process of coding every second piece of frame data 23 to the process of coding each piece of frame data 23 while the GOP length is maintained at three.

In addition, the video coding performing section 15 changes from control for coding three pictures within a GOP into an I-picture, a P-picture, and a P-picture to control for coding three pictures within a GOP into an I-picture, a B-picture, and a P-picture.

FIGS. 21A and 21B represent another example of a frame rate change indicated by the coding control section 14 when the operation frame rate exceeds the initial setting frame rate. FIGS. 21A and 21B represent an example of control being performed with the set GOP length converted to time.

Specifically, on the basis of an indicating signal in timing T32, the operation of coding frame data 23 by the video coding performing section 15 is changed from the process of coding every second piece of frame data 23 to the process of coding each piece of frame data 23 while the period of each GOP for the input moving image data 21 is maintained.

In addition, the video coding performing section 15 changes from control for coding three pictures within a GOP into an I-picture, a P-picture, and a P-picture to control for coding six pictures within a GOP into an I-picture, a B-picture, a P-picture, a B-picture, a P-picture, and a B-picture.

[Postprocessing Operation]

Description will next be made of operation of the output section 16 to which coded video data is input from the video coding performing section 15.

The output section 16 stores the coded frame data 23 input from the video coding performing section 15 in the output moving image data storage section 17.

When an actual operation frame rate for coding by the video coding performing section 15 is equal to or higher than an initial setting frame rate, in particular, the output section 16 stores first output data 25 and second output data 26 in the output moving image data storage section 17.

FIGS. 22A and 22B are diagrams of assistance in explaining an example of postprocessing operation by the output section 16 in FIG. 1.

FIG. 22A is a diagram showing first output data 25. FIG. 22B is a diagram showing second output data 26.

In the case of FIGS. 22A and 22B, the output section 16 interprets the set GOP length as the number of frames, and stores the first output data 25 and the second output data 26 in the output moving image data storage section 17.

Specifically, the output section 16 interprets the set GOP length as the number of frames for each GOP in FIG. 20B, and stores the first output data 25 in the output moving image data storage section 17.

In addition, the output section 16 stores all pictures of each GOP in FIG. 20B as second output data 26 in the output moving image data storage section 17.

The output section 16 thus generates output data corresponding to the initial setting frame rate and output data corresponding to the operation frame rate of the video coding performing section 15 on the basis of one piece of frame data 23 coded by the video coding performing section 15.

FIGS. 23A and 23B are diagrams of assistance in explaining another example of postprocessing operation by the output section 16 in FIG. 1.

FIG. 23A is a diagram showing first output data 25. FIG. 23B is a diagram showing second output data 26.

In the case of FIGS. 23A and 23B, the output section 16 interprets the set GOP length as the number of frames, and stores the first output data 25 and the second output data 26 in the output moving image data storage section 17.

Specifically, the output section 16 interprets the set GOP length as the number of frames for each GOP in FIG. 21B, and stores the first output data 25 in the output moving image data storage section 17.

In addition, the output section 16 stores all pictures of each GOP in FIG. 21B as second output data 26 in the output moving image data storage section 17.

As described above, in the first embodiment, the coding control section 14 changes the frame rate for coding so as to stabilize the data amount of coded image data before the video coding performing section 15 determines whether the coding of frame data 23 is necessary or not on the basis of the buffer model 51.

Thus, in the first embodiment, the video coding performing section 15 less frequently determines during coding whether the coding is necessary or not according to coding conditions, and the frame rate of a plurality of pieces of image data in coded moving image data is stabilized.

As a result, when moving image data coded by the coding device 1 according to the first embodiment is reproduced, the moving image appears to be smooth because the frame rate of the moving image data is stable.

A tendency for an image to be changed immediately or displayed for a while during reproduction as in a case where the video coding performing section 15 determines during coding whether the coding is necessary or not according to coding conditions, for example, is reduced. It is possible to prevent a sense of incongruity from being given to a viewer.

In the first embodiment, because the frame intervals of coded frame data 23 are stabilized to be substantially fixed intervals, a reproducing device 63 for reproducing the frame data 23 can interpolate and reconstruct discretely reduced frames by a simple complementary function.

In particular, the coding control section 14 selects a coding frame rate indicated to the video coding performing section 15 from the frame rate of the input moving image data 21 and divisors (or multiples) of the frame rate of the input moving image data 21.

As a result, in the first embodiment, a plurality of pieces of coded image data correspond to image data of the input moving image data 21 at each fixed interval. It is therefore possible to prevent a sense of incongruity from being given to a viewer.

The coding control section 14 determines the coding frame rate indicated to the video coding performing section 15, sharing the buffer model 51 for the video coding performing section 15 to determine whether the coding of frame data 23 is necessary or not. Thus, the control of the coding control section 14 can prevent the video coding performing section 15 from determining whether to add or delete a frame independently.

In the first embodiment, for overflow suppression, frame intervals are shortened as much as possible, and the number of times of coding per unit time is increased. As a result, the first embodiment can suppress a code amount failure or the like, and makes it possible to maintain fixed frame intervals.

In the first embodiment, the coding control section 14 uses dedicated threshold values for overflow suppression and underflow suppression for the same buffer model 51 (code amount) as in the video coding performing section 15. As a result, in the first embodiment, even when there is a sign of an overflow or an underflow, it is possible to return from that state to a normal state in an early stage. In addition, the first embodiment can therefore suppress a skip due to a code amount failure or the like and maintain fixed frame intervals.

In the first embodiment, when frame intervals are shortened as much as possible, and the number of times of coding per unit time is increased, frames as an increase over an initial rate are coded as non-reference inter-frames, as shown in FIGS. 20A and 20B and FIGS. 21A and 21B. In addition, the output section 16 generates first output data 25 for the initial setting frame rate and second output data 26 for a frame rate higher than the initial setting frame rate. As a result, a reproducing device 63 or the like can select output data according to the performance of the reproducing device 63 or the like from the moving image data of an image quality at the initial setting frame rate and the moving image data of higher image quality, and reproduce the output data.

When an actual operation frame rate exceeds the initial setting frame rate, a time represented by one GOP can be shortened by interpreting the GOP length as the number of coded frames, as shown in FIGS. 18A and 18B and FIGS. 20A and 20B. As a result, the number of intra-frames generated per unit time can be increased, and thus recovery points can be increased in number.

When an actual operation frame rate exceeds the initial setting frame rate, a time represented by one GOP can be lengthened by interpreting the GOP length as coding time, as shown in FIGS. 19A and 19B and FIGS. 21A and 21B. As a result, it is possible to decrease the number of intra-frames, increase a code amount assignable to each frame, and thus improve the image quality of each image.

When an actual operation frame rate is lower than the initial setting frame rate, a time represented by one GOP can be lengthened by interpreting the GOP length as coding time, as shown in FIGS. 17A and 17B. As a result, it is possible to decrease the number of intra-frames, increase a code amount assignable to each frame, and thus improve the image quality of each image. In addition, a code amount (buffer model 51) failure can be further suppressed due to this effect. In addition, because the number of frames carried for the length of one GOP is fixed, a code amount for one GOP can be predicted easily.

2. Second Embodiment

Figure 24:
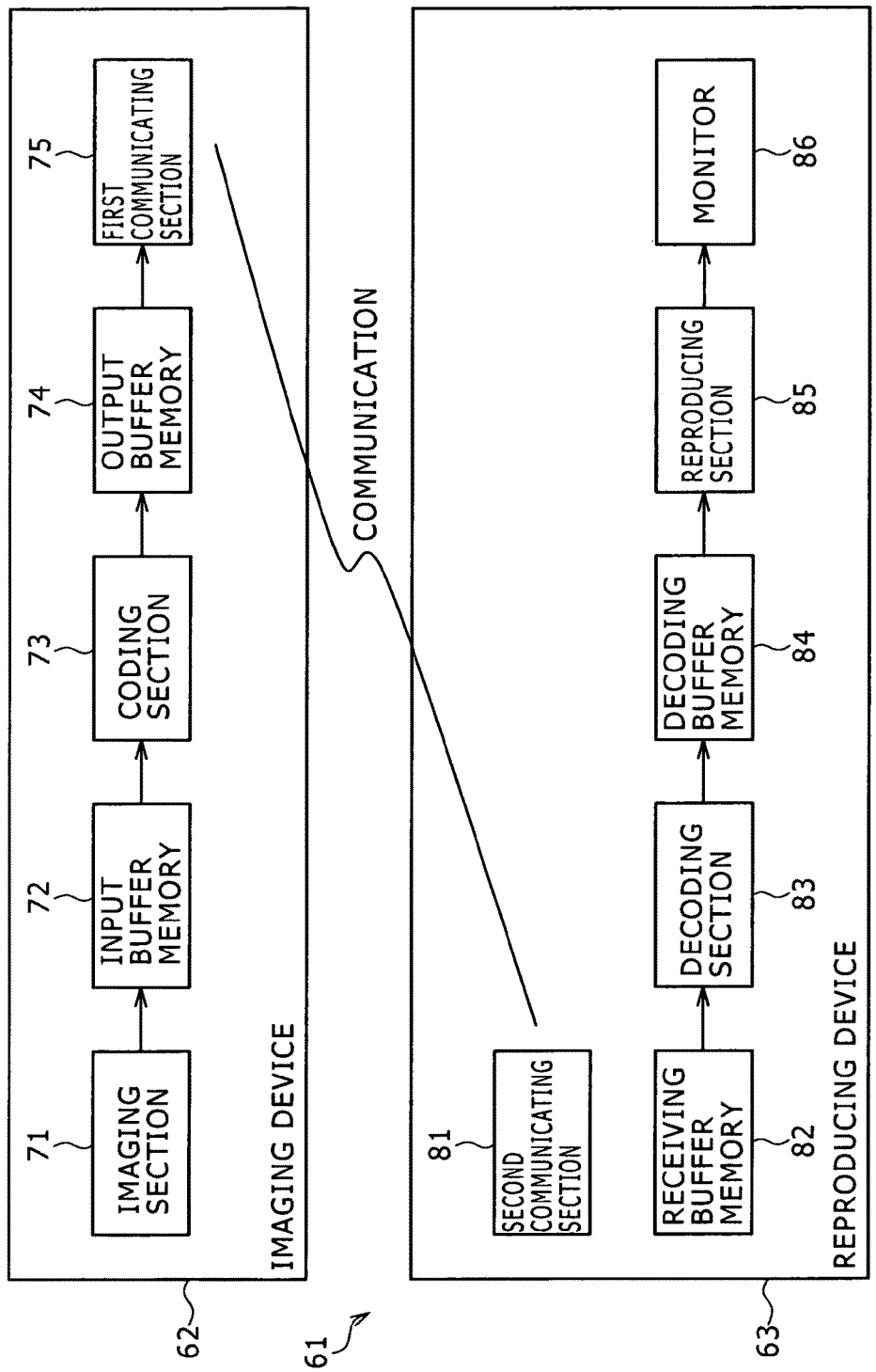
FIG. 24 is a schematic block diagram showing a coding transmission system according to a second embodiment of the present disclosure.

FIG. 24 is a schematic block diagram showing a coding transmission system 61 according to a second embodiment of the present disclosure.

The coding transmission system 61 in FIG. 24 has an imaging device 62 and a reproducing device 63.

The imaging device 62 has an imaging section 71, an input buffer memory 72, a coding section 73, an output buffer memory 74, and a first communicating section 75.

The reproducing device 63 has a second communicating section 81, a receiving buffer memory 82, a decoding section 83, a decoding buffer memory 84, a reproducing section 85, and a monitor 86.

The imaging section 71 in the imaging device 62 is for example a CMOS sensor or a CCD sensor. The imaging section 71 is connected to the input buffer memory 72. The imaging section 71 outputs a signal of a picked-up image to the input buffer memory 72. The input buffer memory 72 stores one piece of picked-up image data.

The coding section 73 is the coding device 1 shown in FIG. 1. The coding section 73 is connected to the input buffer memory 72 and the output buffer memory 74. The coding section 73 obtains image data (frame data 23) constituting the picked-up moving image data from the input buffer memory 72, codes the image data, and outputs the coded image data to the output buffer memory 74. The output buffer memory 74 stores the coded image data.

The first communicating section 75 is for example a radio communicating section. The first communicating section 75 is connected to the output buffer memory 74. The first communicating section 75 transmits the data stored in the output buffer memory 74 by radio in a predetermined communication band.

The second communicating section 81 in the reproducing device 63 is a radio communicating section capable of communicating with the first communicating section 75. The second communicating section 81 is connected to the receiving buffer memory 82. The second communicating section 81 stores the data received from the first communicating section 75 in the receiving buffer memory 82. The receiving buffer memory 82 thereby stores the coded image data.

The decoding section 83 is connected to the receiving buffer memory 82 and the decoding buffer memory 84. The decoding section 83 decodes the coded image data stored in the receiving buffer memory 82, and stores the decoded image data in the decoding buffer memory 84. The decoding buffer memory 84 stores the decoded image data.

The reproducing section 85 is connected to the decoding buffer memory 84 and the monitor 86. The reproducing section 85 outputs the image data stored in the decoding buffer memory 84 to the monitor 86 at a predetermined frame rate. The monitor 86 thereby displays a moving image formed by a plurality of decoded images.

Each of the above embodiments is an example of a preferred embodiment of the present disclosure. However, the present disclosure is not limited to this. Various modifications and changes can be made without departing from the spirit of the disclosure.

For example, the coding device 1 according to the foregoing first embodiment and the coding section 73 according to the second embodiment code each piece of frame data 23 of moving image data by the MPEG-4 visual system.

In addition to this, for example, the coding device 1 or the coding section 73 may code each piece of frame data 23 of moving image data by an H.264 system or an MPEG-2 system.

Figure 25:
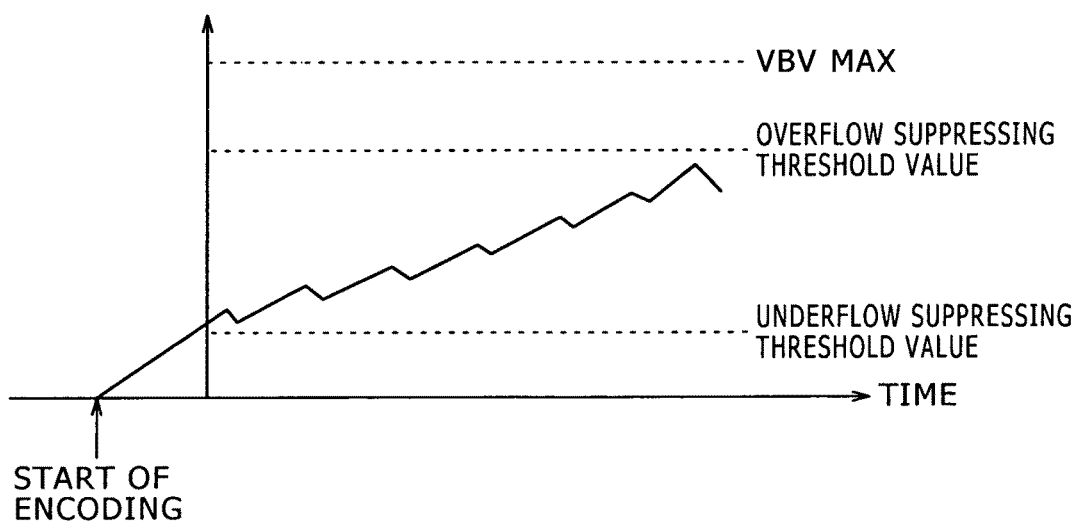
FIG. 25 is a diagram of assistance in explaining coding control operation by the coding control section at a time of coding by an H.264 system or an MPEG-2 system.

FIG. 25 is a diagram of assistance in explaining coding control operation by the coding control section 14 at a time of coding by the H.264 system.

FIG. 25 shows a buffer model 51 conforming to the standard of the H.264 system. An axis of ordinates indicates an amount of data retained within the buffer model 51. An axis of abscissas indicates time. Incidentally, the MPEG-2 system also uses a buffer model 51 similar to that of the H.264 system, and controls an amount of data to be coded as appropriate according to the amount of data retained in the buffer model 51.

In the MPEG-4 visual system, as shown in FIG. 14C, an initial value at a time of starting a coding process is set at a predetermined percentage (%) of the VBV value.

On the other hand, in the H.264 system, as shown in FIG. 25, an initial value at a time of starting coding is set at 0% of the VBV value.

There is thus a small buffer occupation amount immediately after a start of a coding process.

In addition, in the H.264 system, the video coding performing section 15 starts coding control operation according to the data amount of coded data for example after a predetermined period after starting the coding process.

Therefore, in a case where the present disclosure is applied to the video coding performing section 15 of the H.264 system, it suffices for the coding control section 14 to start coding control operation according to the data amount of coded data after the predetermined period.

Incidentally, also in MPEG-2, coding control operation according to the data amount of coded data can be similarly started by control of the coding control section 14.

The foregoing second embodiment is an example in which the coding device 1 according to the first embodiment is applied to the imaging device 62.

The imaging device 62 includes a DSC (Digital Still Camera), a video camera, a surveillance camera, and the like.

The coding device 1 is also applicable to for example portable telephones, PDAs (Personal Digital Assistants), electronic book devices, notebook computer devices, navigation devices, and portable reproducing devices.

In addition, the coding device 1 is applicable to reproducing devices, AV (Audio Visual) devices, DLNA (Digital Living Network Alliance) server devices, and the like.

The present disclosure contains subject matter related to that disclosed in Japanese Priority Patent Application JP 2010-146434 filed in the Japan Patent Office on Jun. 28, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A coding device, comprising:
an obtaining section configured to obtain moving image data including a plurality of pieces of image data reproducible at a determined rate;
a determining section configured to determine whether coding of each piece of said plurality of pieces of image data is necessary, and output an indicating signal indicating whether said image data is set as a coding object, wherein said indicating signal is output based on said moving image data and initial coding information for coding, and wherein said moving image data includes information on a frame rate of input moving image data and information on a photographing environment in which said input moving image data was taken; and
a coding performing section configured to:
receive said indicating signal; and
code said plurality of pieces of image data while reducing said image data based on said determination to provide coded moving image data, wherein said determining section is further configured to:
stabilize an initial frame rate of said image data to have substantially fixed frame intervals;
change a frame rate and change reproduction intervals of said plurality of pieces of image data in said coded moving image data coded by said coding performing section, said reproduction intervals having uncoded pieces of said moving image data between coded pieces of said moving image data; and
update said indicating signal to narrow said reproduction intervals of said coded moving image data based on said indicating signal, in an event an amount of data stored in a buffer is greater than an overflow suppressing threshold value, and wherein said buffer is configured to store said coded moving image data.

2. The coding device according to claim 1, wherein
said coding performing section is further configured to output a notification signal to repeatedly notify a data amount of said coded moving image data to said determining section, and
said determining section is further configured to output said indicating signal, update said indicating signal while said plurality of pieces of image data is coded such that said reproduction intervals of said plurality of pieces of image data in said coded moving image data tend to equal intervals under a condition of said data amount of said coded moving image data, said data amount of said coded moving image data being notified repeatedly by said notification signal.

3. The coding device according to claim 2, wherein
said determining section is further configured to compare said data amount of said coded moving image data, said data amount of said coded moving image data being notified by said notification signal, with said amount of data stored in said buffer,
said determining section is further configured to update said indicating signal to widen said reproduction intervals of said coded moving image data based on said indicating signal, in an event said amount of data stored in said buffer is less than an underflow suppressing threshold value.

4. The coding device according to claim 1, wherein said coding performing section is further configured to reduce and code said image data obtained by said obtaining section so that said data amount of said coded moving image data is within a determined range based on an own judgment of said coding performing section based on said data amount of said coded moving image data.

5. The coding device according to claim 4, wherein
said coding performing section is further configured to reduce said image data to be coded based on an own judgment of said coding performing section in an event said amount of data stored in said buffer is less than an underflow suppressing threshold value, and
said coding performing section is further configured to increase said image data to be coded based on an own judgment of said coding performing section, in an event said amount of data stored in said buffer is greater than said overflow suppressing threshold value.

6. The coding device according to claim 5, wherein
said coding performing section is further configured to determine addition or deletion of image data to be coded based on whether said buffer overflows or underflows, and
said determining section is further configured to determine whether said coding of each piece of image data indicated in said indicating signal is necessary based on a reference value set for said amount of data stored in said buffer.

7. The coding device according to claim 1, wherein
in an event a coding rate of said plurality of pieces of image data coded by said coding performing section based on said indicating signal is lower than a coding rate set in advance, said determining section is further configured to update said indicating signal so that said plurality of pieces of image data are coded at intervals wider than intervals corresponding to said coding rate set in advance.

8. The coding device according to claim 1, wherein
in an event a coding rate of said plurality of pieces of image data coded by said coding performing section based on said indicating signal is higher than a coding rate set in advance, said determining section is further configured to update said indicating signal so that said plurality of pieces of image data are coded at intervals narrower than intervals corresponding to said coding rate set in advance.

9. The coding device according to claim 8, wherein
said determining section is further configured to update said indicating signal until said plurality of pieces of image data coded by said coding performing section based on said indicating signal are in one-to-one correspondence with said plurality of pieces of image data obtained by said obtaining section at a maximum, and
said determining section is further configured to set a maximum coding rate of said plurality of pieces of image data coded by said coding performing section equal to a rate of said plurality of pieces of image data obtained by said obtaining section.

10. The coding device according to claim 1, wherein
said determining section is further configured to output said indicating signal for each group of a plurality of pieces of image data of said moving image data obtained by said obtaining section, and
said determining section indicates whether coding of said plurality of pieces of image data included in said each group corresponding to said indicating signal is necessary in said indicating signal.

11. The coding device according to claim 10, wherein
said determining section is further configured to change said indicating signal to increase or decrease a number of said plurality of pieces of image data in said moving image data obtained by said obtaining section, said number of said plurality of pieces of image data corresponding to said each group.

12. The coding device according to claim 11, wherein
said coding performing section is further configured to output a notification signal to notify a data amount of said coded moving image data to said determining section each time said coding performing section codes a plurality of pieces of image data within said each group based on said indicating signal, and
said determining section is further configured to output said indicating signal updates said indicating signal for a group indicated next such that said reproduction intervals of said plurality of pieces of image data in said coded moving image data tend to equal intervals under a condition of said data amount of said coded moving image data, said data amount of said coded moving image data being notified by said notification signal.

13. The coding device according to claim 1, further comprising:

a postprocessing section supplied with said coded moving image data from said coding performing section, wherein in an event a coding rate of said plurality of pieces of image data in said coded moving image data is higher than a coding rate set in advance, said postprocessing section is further configured to generate moving image data for said higher rate and moving image data for said coding rate set in advance.

14. An imaging device, comprising:

an imaging section configured to output moving image data including a plurality of pieces of image data obtained by an image capture device at a determined rate; and a coding section configured to code said moving image data, wherein said coding section includes:
an obtaining section configured to obtain said moving image data output from said imaging section;
a determining section configured to determine whether coding of each piece of said image data is necessary, and output an indicating signal indicating whether said image data is set as a coding object, wherein said indicating signal is output based on said moving image data and initial coding information for coding, and wherein said moving image data includes information on a frame rate and information on a photographing environment; and
a coding performing section configured to:
receive said indicating signal; and
code said plurality of pieces of image data while reducing said image data based on said determination to provide coded moving image data,
wherein said determining section is further configured to:
stabilize an initial frame rate of said image data to have substantially fixed frame intervals;
change a frame rate and change reproduction intervals of said plurality of pieces of image data in said coded moving image data coded by said coding performing section, said reproduction intervals having uncoded pieces of said moving image data between coded pieces of said moving image data; and
update said indicating signal to narrow said reproduction intervals of said coded moving image data based on said indicating signal, in an event an amount of data stored in a buffer is greater than an overflow suppressing threshold value, and wherein said buffer is configured to store said coded moving image data.

15. A coding transmission system, comprising:

a coding section configured to code moving image data including plurality of pieces of image data obtained by an image capture device at a determined rate;

a transmitting section configured to transmit said coded moving image data;

a receiving section configured to receive said coded moving image data transmitted by said transmitting section; and a decoding section configured to decode said coded moving image data received by said receiving section, wherein
said coding section includes:
an obtaining section configured to obtain said moving image data output from an imaging section;
a determining section configured determine whether coding of each piece of said image data is necessary, and output an indicating signal indicating whether said image data is set as a coding object, wherein said indicating signal is output based on said moving image data and initial coding information for coding, and wherein said moving image data includes information on a frame rate and information on a photographing environment; and
a coding performing section configured to:
receive said indicating signal; and
code said plurality of pieces of image data while reducing said image data based on said determination to provide said coded moving image data,
wherein said determining section is further configured to:
stabilize an initial frame rate of said image data to have substantially fixed frame intervals;
change a frame rate and change reproduction intervals of said plurality of pieces of image data in said coded moving image data coded by said coding performing section, said reproduction intervals having uncoded pieces of said moving image data between coded pieces of said moving image data; and
update said indicating signal so as to narrow said reproduction intervals of said coded moving image data based on said indicating signal, in an event an amount of data stored in a buffer is greater than an overflow suppressing threshold value, and wherein said buffer is configured to store said coded moving image data.

16. A coding method, comprising:

obtaining moving image data including a plurality of pieces of image data reproducible at a determined rate;

determining whether coding of each piece of said image data of said moving image data is necessary and outputting an indicating signal indicating whether said image data is set as a coding object, wherein said indicating signal is output based on said moving image data and initial coding information for coding, and wherein said moving image data includes information on a frame rate and information on a photographing environment;

coding said image data of said moving image data while discretely reducing said image data of said moving image data based on said determination to provide coded moving image data;

stabilizing an initial frame rate of said image data to have substantially fixed frame intervals;

changing a frame rate and reproduction intervals of said plurality of pieces of image data in said coded moving image data, said reproduction intervals having uncoded pieces of said moving image data between coded pieces of said moving image data;

updating said indicating signal to narrow said reproduction intervals of said coded moving image data based on said indicating signal, in an event an amount of data stored in a buffer is greater than an overflow suppressing threshold value, and wherein said buffer is configured to store said coded moving image data.

17. The coding device according to claim 1, wherein said initial coding information includes profile, a level, bit rate of said coded moving image data, GOP length, or frame intervals of said coded moving image data.

* * * * *